US012589721B2

(12) United States Patent
Cho

(10) Patent No.: US 12,589,721 B2
(45) Date of Patent: Mar. 31, 2026

(54) BRAKE DEVICE AND METHOD FOR CONTROLLING SAME

(71) Applicant: HL MANDO CORPORATION, Pyeongtaek-si (KR)

(72) Inventor: Kyung Ran Cho, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 1037 days.

(21) Appl. No.: 17/277,810

(22) PCT Filed: Sep. 18, 2019

(86) PCT No.: PCT/KR2019/012053
§ 371 (c)(1),
(2) Date: Mar. 19, 2021

(87) PCT Pub. No.: WO2020/060180
PCT Pub. Date: Mar. 26, 2020

(65) Prior Publication Data
US 2021/0347347 A1 Nov. 11, 2021

(30) Foreign Application Priority Data
Sep. 19, 2018 (KR) ........................ 10-2018-0111992

(51) Int. Cl.
*B60T 8/36* (2006.01)
*B60T 13/66* (2006.01)
(Continued)

(52) U.S. Cl.
CPC ............ *B60T 13/662* (2013.01); *B60T 8/363* (2013.01); *B60T 8/366* (2013.01); *B60T 13/686* (2013.01); *B60T 13/74* (2013.01); *F16K 31/0675* (2013.01)

(58) Field of Classification Search
CPC ............................. B60T 13/68; F16K 31/0675
See application file for complete search history.

(56) References Cited

U.S. PATENT DOCUMENTS 5,892,650 A * 4/1999 Kinoshita ................. B60T 8/36
361/152
6,209,513 B1 * 4/2001 Sakasai ................... F02D 41/20
123/299
(Continued)

FOREIGN PATENT DOCUMENTS

CN 103448790 A 12/2013
CN 104108387 A 10/2014
(Continued)

OTHER PUBLICATIONS

Office Action issued on Aug. 19, 2022, for corresponding Korean Patent Application No. 10-2021-7007894 (10 pages).
(Continued)

*Primary Examiner* — Nicholas J Lane
(74) *Attorney, Agent, or Firm* — Hauptman Ham, LLP

(57) ABSTRACT

Provided is a brake apparatus including: a solenoid valve provided on the flow path and including a coil to open or close a flow path; a main driving circuit electrically connected to the coil to allow or block a current flowing through the coil; a sub driving circuit electrically connected to the coil and connected in parallel with the main driving circuit to allow or block a current flowing through the coil; a main cut-off switch electrically connected to the main driving circuit; a sub cut-off switch electrically connected to the sub driving circuit; and a processor configured to control at least one of the main driving circuit and the sub driving circuit to drive the solenoid valve.

8 Claims, 16 Drawing Sheets

(51) Int. Cl.
    *B60T 13/68*          (2006.01)
    *B60T 13/74*          (2006.01)
    *F16K 31/06*          (2006.01)

(56)               References Cited

U.S. PATENT DOCUMENTS

| | | | | |
|---|---|---|---|---|
| 2005/0035656 A1* | 2/2005 | Kuramochi | .......... | H02J 7/1423 |
| | | | | 307/10.1 |
| 2010/0243388 A1* | 9/2010 | Holzwarth | ............. | B60T 8/885 |
| | | | | 188/158 |
| 2015/0340183 A1* | 11/2015 | Ko | ........................ | B60T 13/662 |
| | | | | 361/160 |
| 2019/0092297 A1* | 3/2019 | Ayichew | ............... | B60T 13/662 |
| 2020/0406879 A1* | 12/2020 | Hecker | ................. | B60T 13/683 |
| 2021/0269048 A1* | 9/2021 | Herges | ................. | B60T 17/221 |
| 2022/0089168 A1* | 3/2022 | Hoos | .................... | B60L 3/0092 |

FOREIGN PATENT DOCUMENTS

| | | | |
|---|---|---|---|
| CN | 104417456 A | 3/2015 | |
| DE | 10 2008 039 781 A1 | 4/2009 | |
| DE | 10 2011 118 080 A1 | 5/2013 | |
| DE | 10 2016 203 563 A1 | 9/2017 | |
| DE | 10 2017 129 965 A1 | 6/2018 | |
| EP | 1332938 A2 | 8/2003 | |
| JP | 2001-513731 A | 9/2001 | |
| JP | 2010-199438 A | 9/2010 | |
| KR | 10-2017-0095490 A | 8/2017 | |
| WO | 2016-096532 | 6/2016 | |
| WO | 2017-148968 A1 | 9/2017 | |

OTHER PUBLICATIONS

Office Action issued on Sep. 23, 2022, for corresponding Chinese Patent Application No. 201980061216.X (12 pages).
International Search Report dated Jan. 6, 2020, in connection with corresponding International Patent Application No. PCT/KR2019/012053.
German Office Action issued on Oct. 27, 2023, in connection with the German Patent Application No. 11 2019 004 684.5, with its English translation (23 pages).

\* cited by examiner

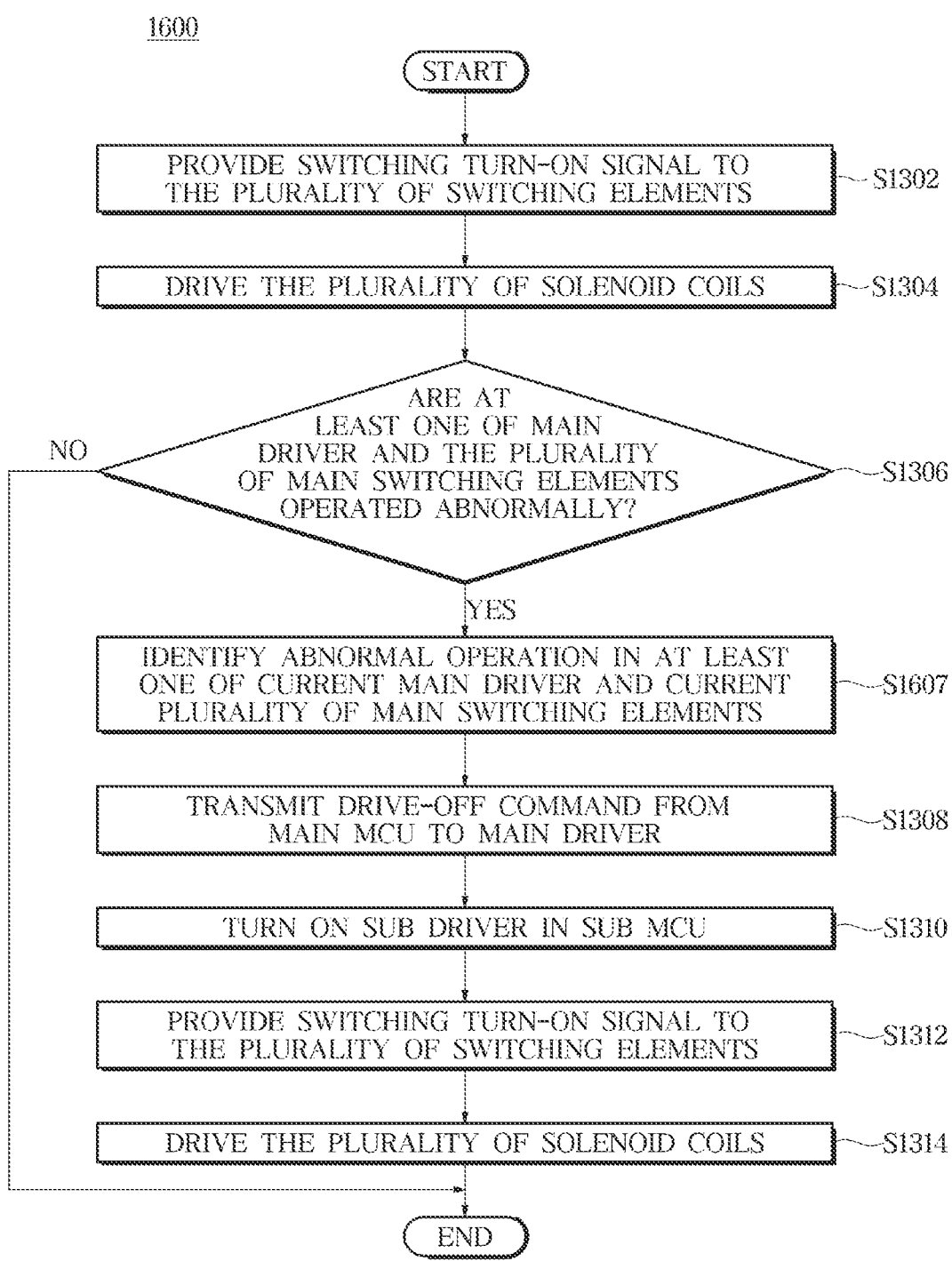

1600

START

PROVIDE SWITCHING TURN-ON SIGNAL TO
THE PLURALITY OF SWITCHING ELEMENTS ── S1302

DRIVE THE PLURALITY OF SOLENOID COILS ── S1304

ARE AT
LEAST ONE OF MAIN
DRIVER AND THE PLURALITY
OF MAIN SWITCHING ELEMENTS
OPERATED ABNORMALLY? ── S1306

NO

YES

IDENTIFY ABNORMAL OPERATION IN AT LEAST
ONE OF CURRENT MAIN DRIVER AND CURRENT
PLURALITY OF MAIN SWITCHING ELEMENTS ── S1607

TRANSMIT DRIVE-OFF COMMAND FROM
MAIN MCU TO MAIN DRIVER ── S1308

TURN ON SUB DRIVER IN SUB MCU ── S1310

PROVIDE SWITCHING TURN-ON SIGNAL TO
THE PLURALITY OF SWITCHING ELEMENTS ── S1312

DRIVE THE PLURALITY OF SOLENOID COILS ── S1314

END

BRAKE DEVICE AND METHOD FOR CONTROLLING SAME

CROSS-REFERENCE TO RELATED APPLICATION

The present application is a national stage filing under 35 U.S.C § 371 of PCT application number PCT/KR2019/012053 filed on Sep. 18, 2019 which is based upon and claims the benefit of priorities to Korean Patent Application No. 10-2018-0111992, filed on Sep. 19, 2018 in the Korean Intellectual Property Office, which are incorporated herein in their entireties by reference.

BACKGROUND

1. Field of the Invention

The present invention relates to a brake apparatus including a solenoid valve driving apparatus and a controlling method thereof.

2. Description of Related Art

In general, a brake apparatus including a conventional solenoid valve driving apparatus selectively drives a solenoid valve using a switching element.

As an example, a failure determination apparatus of a hydraulic switch capable of determining a failure of a hydraulic switch based on a signal of the hydraulic switch when driving a solenoid valve has been disclosed as described in Korean Patent Publication No. 10-1780607 (2017.09.14).

However, the conventional failure determination apparatus of the hydraulic switch has a limitation in efficiently driving the solenoid valve.

Also, the conventional failure determination apparatus of the hydraulic switch has a limitation in shortening the maintenance time of a main driver for driving a solenoid valve and a plurality of main switching elements.

BRIEF SUMMARY

Therefore, it is an aspect of the disclosure to provide a brake apparatus including a solenoid valve driving apparatus capable of efficiently driving a solenoid valve, and a controlling method thereof.

It is an aspect of the disclosure to provide a brake apparatus including a solenoid valve driving apparatus capable of efficiently driving a solenoid coil and a controlling method thereof.

It is an aspect of the disclosure to provide a brake apparatus including a solenoid valve driving apparatus capable of shortening maintenance time for maintenance of a main driver and a plurality of main switching elements, and a controlling method thereof.

It is an aspect of the disclosure to provide a brake apparatus including: a solenoid valve provided on the flow path and including a coil to open or close a flow path; a main driving circuit electrically connected to the coil to allow or block a current flowing through the coil; a sub driving circuit electrically connected to the coil and connected in parallel with the main driving circuit to allow or block a current flowing through the coil; a main cut-off switch electrically connected to the main driving circuit; a sub cut-off switch electrically connected to the sub driving circuit; and a processor configured to control at least one of the main driving circuit and the sub driving circuit to drive the solenoid valve.

The processor may control the main driving circuit to turn on the main cut-off switch, turn off the sub cut-off switch, and drive the solenoid valve. The processor may control the sub driving circuit to turn on the sub cut-off switch and drive the solenoid valve in response to a failure of the main driving circuit.

The main driving circuit may include a main driving switch allowing or blocking a current flowing through the coil, and a main driver configured to control opening/closing of the main driving switch. The sub driving circuit may include a sub driving switch connected in parallel with the main switch to allow or block a current flowing through the coil, and a sub driver configured to control opening/closing of the sub driving switch.

The brake apparatus may further include a main diode provided between the coil and the main driving switch; and a sub diode provided between the coil and the sub driving switch.

The coil may be connected to a power source, the main cut-off switch and the sub cut-off switch may be connected to a ground, the main driving switch may be provided between the coil and the main cut-off switch, and the sub driving switch may be provided between the coil and the sub cut-off switch.

The main diode may allow a current from the coil to the main driving switch and block a current from the main driving switch to the coil. The sub diode may allow a current from the coil to the sub driving switch and block a current from the sub driving switch to the coil.

The main cut-off switch and the sub cut-off switch may be connected to a power source, the coil may be connected to a ground, the main driving switch may be provided between the coil and the main cut-off switch, and the sub driving switch may be provided between the coil and the sub cut-off switch.

The main diode may allow a current from the main driving switch to the coil and block a current from the coil to the main driving switch. The sub diode may allow current from the coil to the sub driving switch to the coil and block current to the sub driving switch.

The processor may include a main processor configured to control the main cut-off switch and the main driving circuit; and a sub processor configured to control the sub cut-off switch and the sub driving circuit.

It is an aspect of the disclosure to provide a brake apparatus including: a first solenoid valve including a first coil; a second solenoid valve including a second coil; a first main driving circuit allowing or blocking the current flowing through the first coil; a second main driving circuit allowing or blocking the current flowing through the second coil; a first sub driving circuit connected in parallel with the first main switch to allow or block a current flowing through the first coil; a second sub driving circuit connected in parallel with the second main switch to allow or block a current flowing through the second coil; a main cut-off switch electrically connected to the first and second main driving circuits; a sub cut-off switch electrically connected to the first and second sub driving circuits; and a processor configured to control the first and second main driving circuits, the first and second sub driving circuits, the main cut-off switch, and the sub cut-off switch.

The processor may control the first and second main driving circuits to turn on the main cut-off switch, turn off the sub cut-off switch, and drive the first and second solenoid valves. The processor may control the first and second sub driving circuits to turn on the sub cut-off switch and drive the first and second solenoid valves in response to a failure of at least one of the first and second main driving circuits.

The first main driving circuit may include a first main driving switch configured to allow or block a current flowing through the first coil and a first main driver configured to control the opening and closing of the first main driving switch. The second main driving circuit may include a second main driving switch configured to allow or block a current flowing through the second coil and a second main driving switch configured to control the opening/closing of the second main driving switch. The first sub driving circuit may include a first sub driving switch connected in parallel with the first main driving switch to allow or block a current flowing through the first coil; and a first sub driver configured to control the opening and closing of the first sub driving switch. The second sub driving circuit may include a second sub driving switch connected in parallel with the second main driving switch to allow or block a current flowing through the second coil; and a second sub driver configured to control the opening and closing of the second sub driving switch.

The brake apparatus may further include a first main diode provided between the first coil and the first main driving switch; a second main diode provided between the second coil and the second main driving switch; a first sub diode provided between the first coil and the first sub driving switch; and a second sub diode provided between the second coil and the second sub driving switch.

The first and second coils may be connected to a power source, the main cut-off switch and the sub cut-off switch may be connected to ground, the first and second main driving switches may be provided between the first and second coils and the main cut-off switch, respectively, and the first and second sub driving switches may be provided between the first and second coils and the sub cut-off switch.

The first and second main diodes may allow currents from the first and second coils to the first and second main driving switches, respectively, and block current from the first and second main driving switches to the first and second coils. The first and second sub diodes may allow currents from the first and second coils to the first and second sub driving switches, respectively, and block current from the first and second sub driving switches to the first and second coils.

The main cut-off switch and the sub cut-off switch may be connected to a power source, the first and second coils may be connected to ground, the first and second main driving switches may be provided between the first and second coils and the main cut-off switch, respectively, and the first and second sub driving switches may be provided between the first and second coils and the sub cut-off switch.

The first and second main diodes may allow currents from the first and second main driving switches to the first and second coils, respectively, and block a current from the first and second coils to the first and second main driving switches. The first and second sub diodes may allow currents from the first and second sub driving switches to the first and second coils, respectively, and block current from the first and second coils to the first and second sub driving switches.

The processor may include a main processor configured to control the main cut-off switch and the first and second main driving circuits; and a sub processor configured to control the sub cut-off switch and the first and second sub driving circuits.

It is an aspect of the disclosure to provide a controlling method of a brake apparatus including a solenoid configured to include a coil, a main driving circuit configured to allow or block a current flowing through the coil, a sub driving circuit connected in parallel with the main driving circuit to allow or block a current flowing through the coil; a main cut-off switch electrically connected to the main driving circuit and a sub cut-off switch electrically connected to the sub driving circuit, including: turning on the main cut-off switch; turning off the sub cut-off switch; controlling the main drive circuit to drive the solenoid valve; turning on the sub cut-off switch and controlling the sub driving circuit to drive the solenoid valve in response to a failure of the main driving circuit.

A brake apparatus including a solenoid valve driving apparatus and a controlling method thereof according to an aspect of the disclosure may efficiently drive the solenoid valve.

A brake apparatus including a solenoid valve driving apparatus and a controlling method thereof according to an aspect of the disclosure may efficiently drive a solenoid coil.

A brake apparatus including a solenoid valve driving apparatus and a controlling method thereof according to an aspect of the disclosure may shorten a maintenance time for maintenance of a main driver and a plurality of main switching elements.

BRIEF DESCRIPTION OF THE DRAWINGS

FIG. 4 is a circuit diagram illustrating a state in which the first main voltage regulating switching element shown in FIG. 3 operates abnormally.

FIG. 5 is a circuit diagram illustrating a state in which the second main voltage regulating switching element shown in FIG. 3 operates abnormally.

FIG. 6 is a circuit diagram illustrating a state in which the main power supply cutoff switching element shown in FIG. 3 operates abnormally.

FIG. 7 is a circuit diagram illustrating a state in which the main driver shown in FIG. 3 is abnormally operated as an example.

FIG. 8 is a circuit diagram illustrating a solenoid valve driving apparatus according to an exemplary embodiment of the present invention as another example.

FIG. 9 is a circuit diagram illustrating a state in which the first main voltage regulating switching element shown in FIG. 8 is abnormally operated, as another example.

FIG. 12 is a circuit diagram illustrating a state in which the main driver shown in FIG. 8 is abnormally operated, as another example.

FIG. 16 is a flow chart illustrating a method of driving a solenoid valve of a solenoid valve driving apparatus according to an exemplary embodiment of the present invention as another example.

DETAILED DESCRIPTION

Hereinafter, embodiments of the present invention will be described in detail with reference to the accompanying drawings. The following embodiments are provided to fully convey the spirit of the disclosure to a person having ordinary skill in the art to which the disclosure belongs. The disclosure is not limited to the embodiments shown herein but may be embodied in other forms. In order to make the description of the disclosure clear, unrelated parts are not shown and, the sizes of components are exaggerated for clarity.

Figure 1:
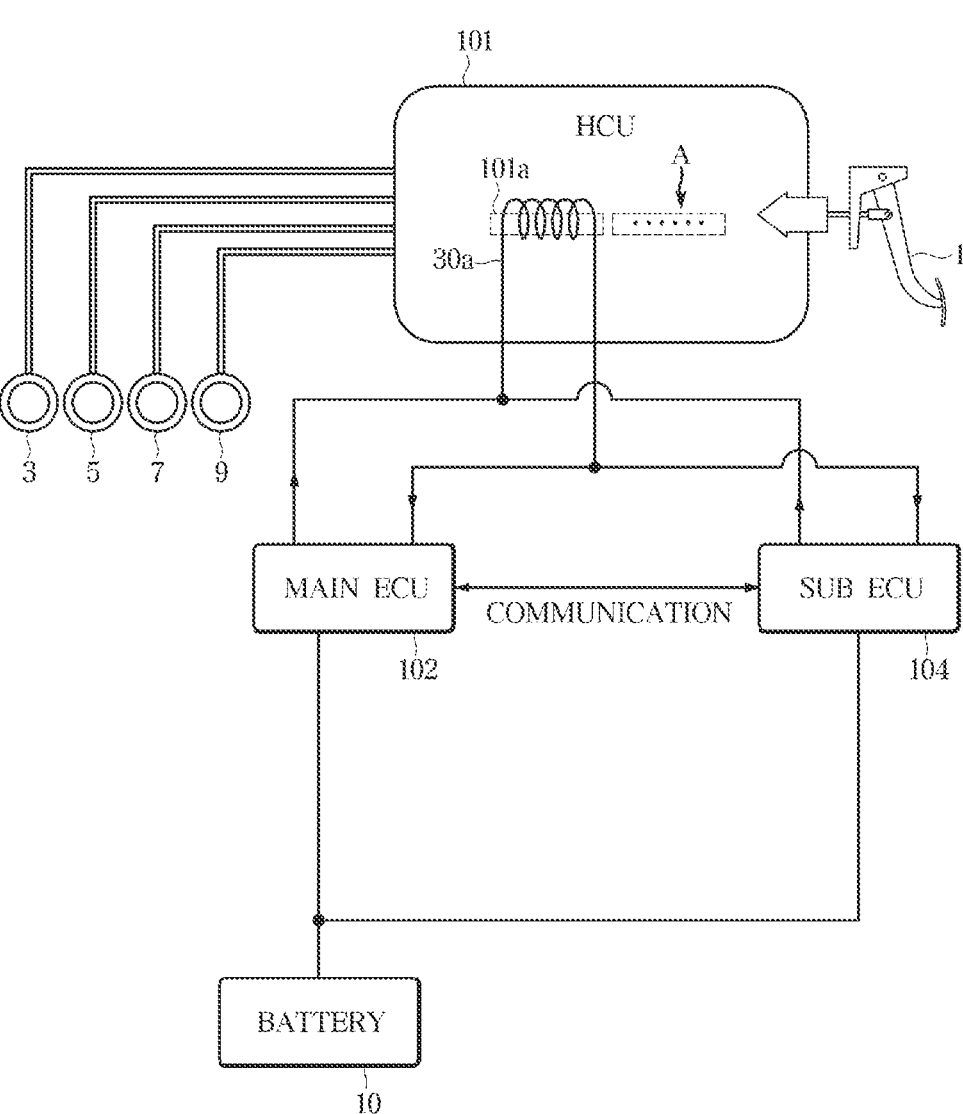
FIG. 1 is a view showing a solenoid valve driving apparatus according to an exemplary embodiment of the present invention.
Figure 2:
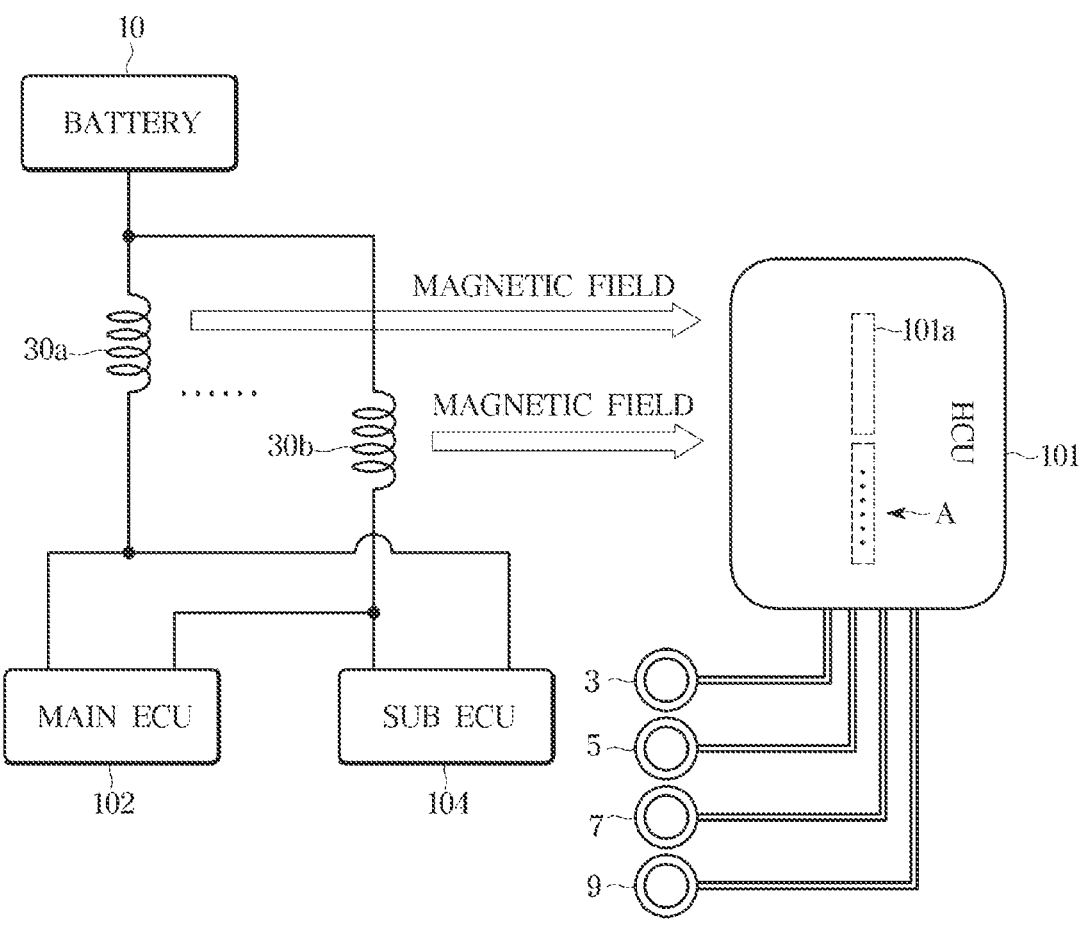
FIG. 2 is a view showing a process of forming a magnetic field by operation of a plurality of solenoid coils in order to operate one solenoid valve shown in FIG. 1.

FIG. 1 is a view showing a solenoid valve driving apparatus according to an exemplary embodiment of the present invention, and FIG. 2 is a view showing a process of forming a magnetic field by operation of a plurality of solenoid coils in order to operate one solenoid valve shown in FIG. 1.

Referring to FIGS. 1 and 2, a solenoid valve driving apparatus according to an exemplary embodiment of the present invention includes a hydraulic control unit HCU 101 and an electronic control unit ECU 102 and 104.

The HCU 101 includes a hydraulic circuit having a flow path, and controls a plurality of wheels 3, 5, 7, and 9 hydraulically using a plurality of solenoid valves 101a according to the operation of a brake pedal 1. The plurality of solenoid valves 101a may open and close the flow path of the HCU 101.

The ECUs 102 and 104 may include a main ECU 102 and a sub ECU 104. The main ECU 102 and the sub ECU 104 may be provided integrally or may be provided separately.

The main ECU 102 is connected to a battery 10 and forms a magnetic field by the operation of solenoid coils 30a and 30b to operate the solenoid valve 101a.

The sub ECU 104 is connected to the battery 10, communicates with the main ECU 102, and operates the solenoid valve 101a by forming a magnetic field by the operation of the solenoid coils 30a and 30b in place of the main ECU 102.

As an example, the main ECU 102 may operate one of the solenoid valves 101a by forming a magnetic field by one operation of the solenoid coils 30a and 30b, and By operating the sub electronic element through communication with the main ECU 102 when the main electronic element of the main ECU 102 operates abnormally, the sub ECU 104 may control the HCU 101 to operate one of the solenoid valves 101a by forming a magnetic field in place of the main ECU 102 with the solenoid coils 30a and 30b operated by the main ECU 102.

At this time, for a failure in which the sub ECU 104 may not form a magnetic field instead such as a failure of the solenoid coils 30a, 30b, the HCU 101 may be operated with reduced performance by operating the other solenoid valves A except for the corresponding solenoid valve 101a.

Figure 3:
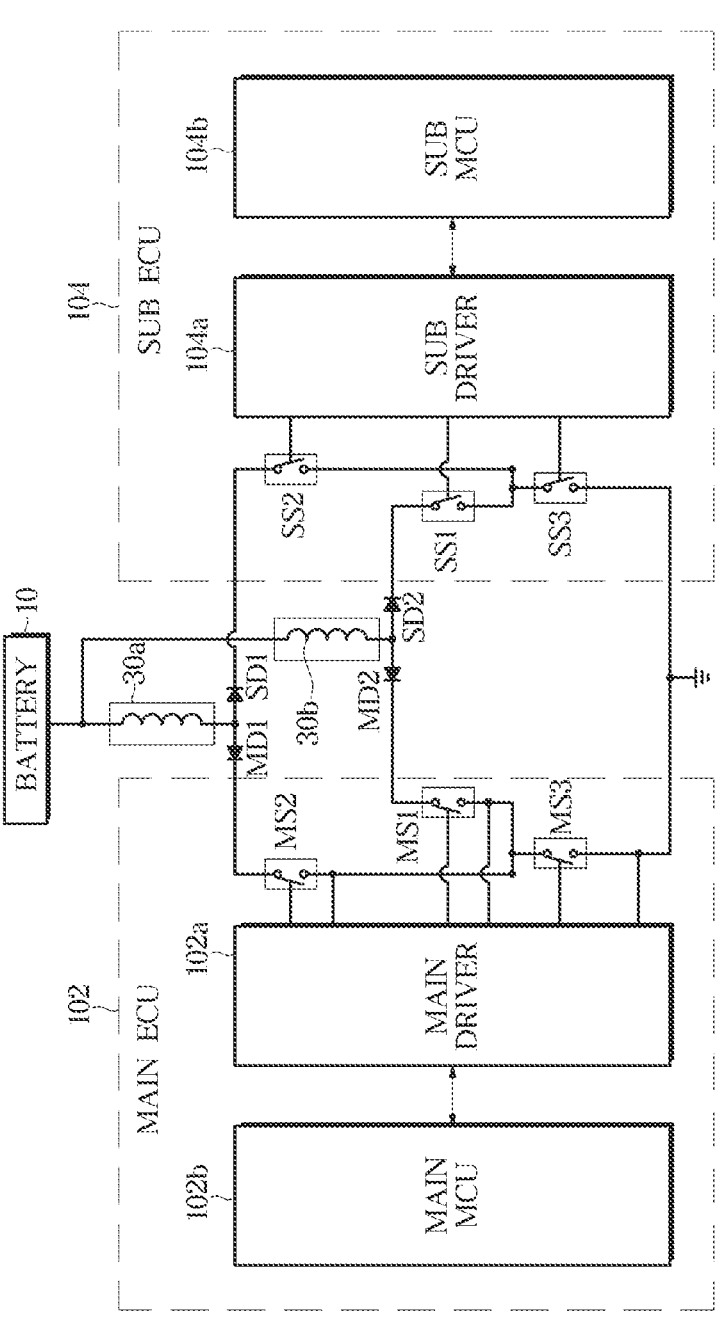
FIG. 3 is a circuit diagram showing as an example of a solenoid valve driving apparatus according to an exemplary embodiment of the present invention.
Figure 4:
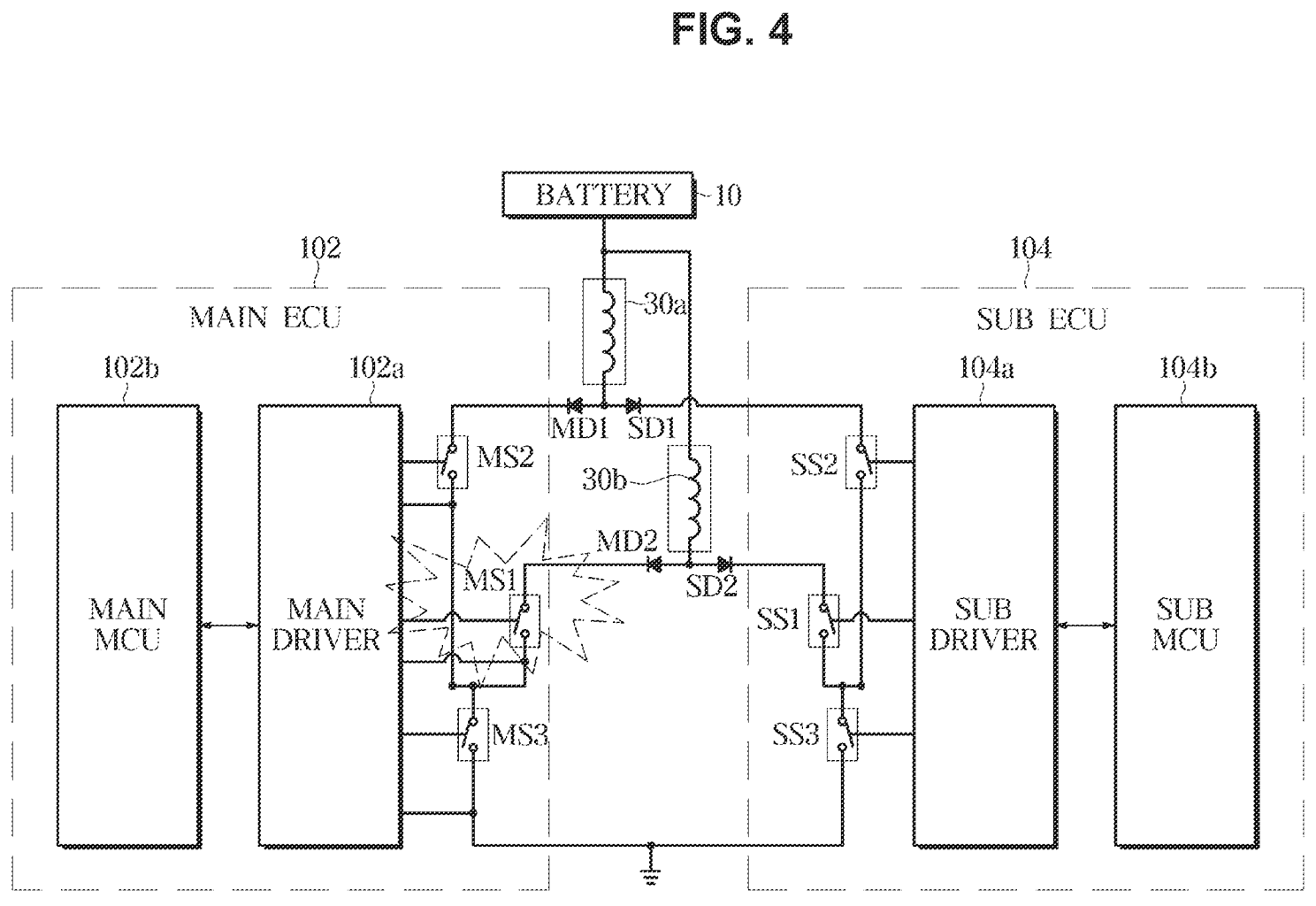
Figure 5:
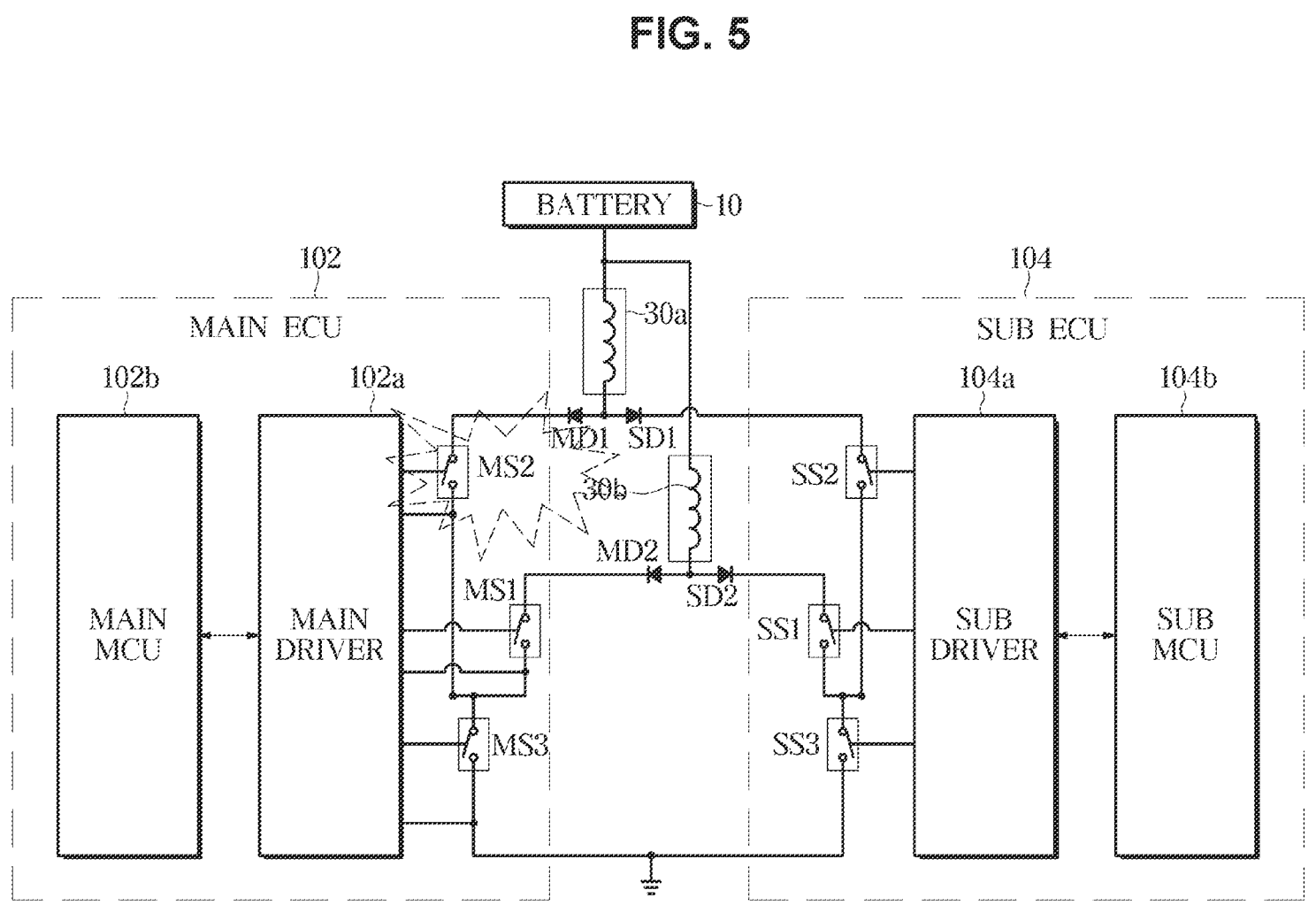
Figure 6:
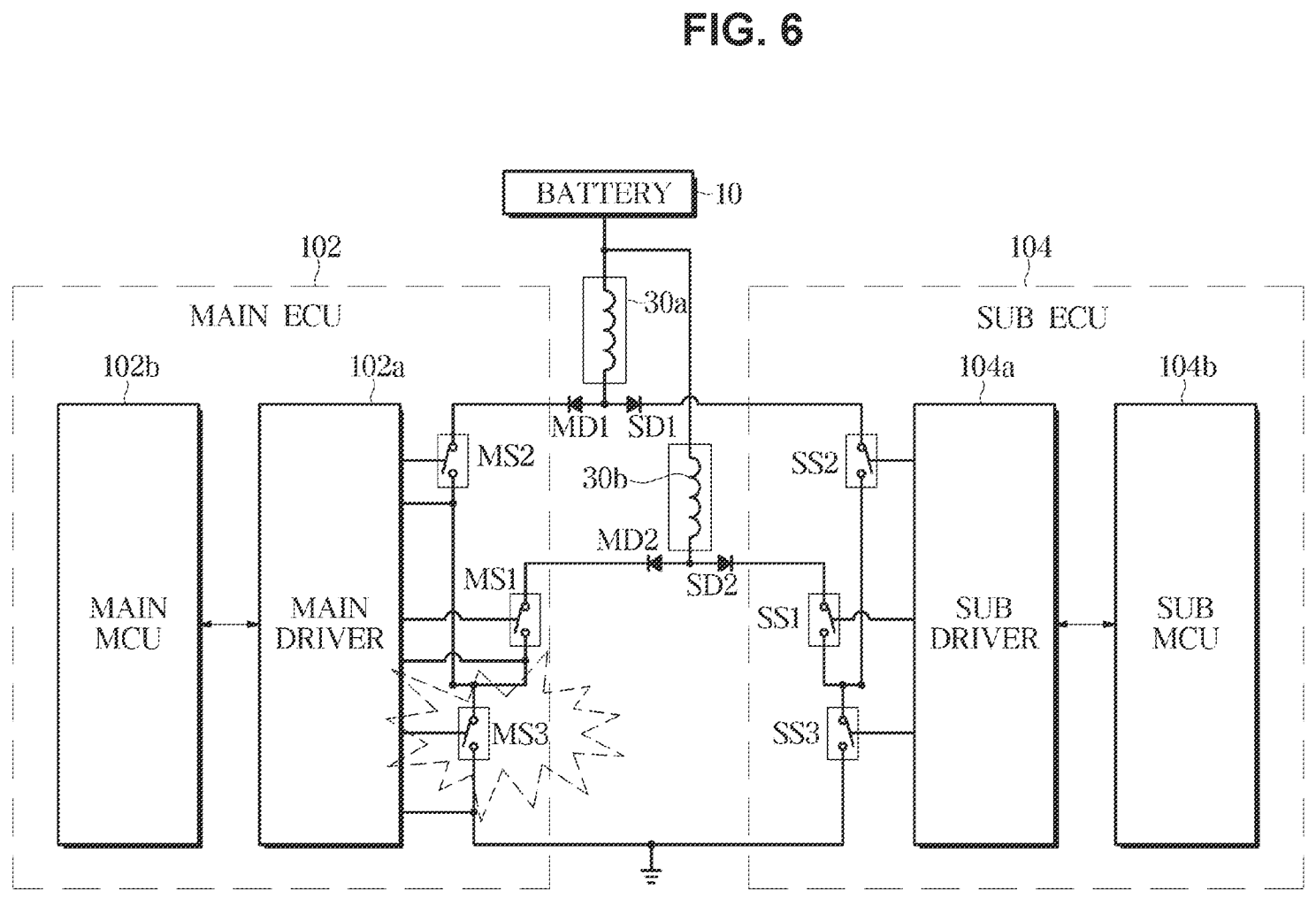
Figure 7:
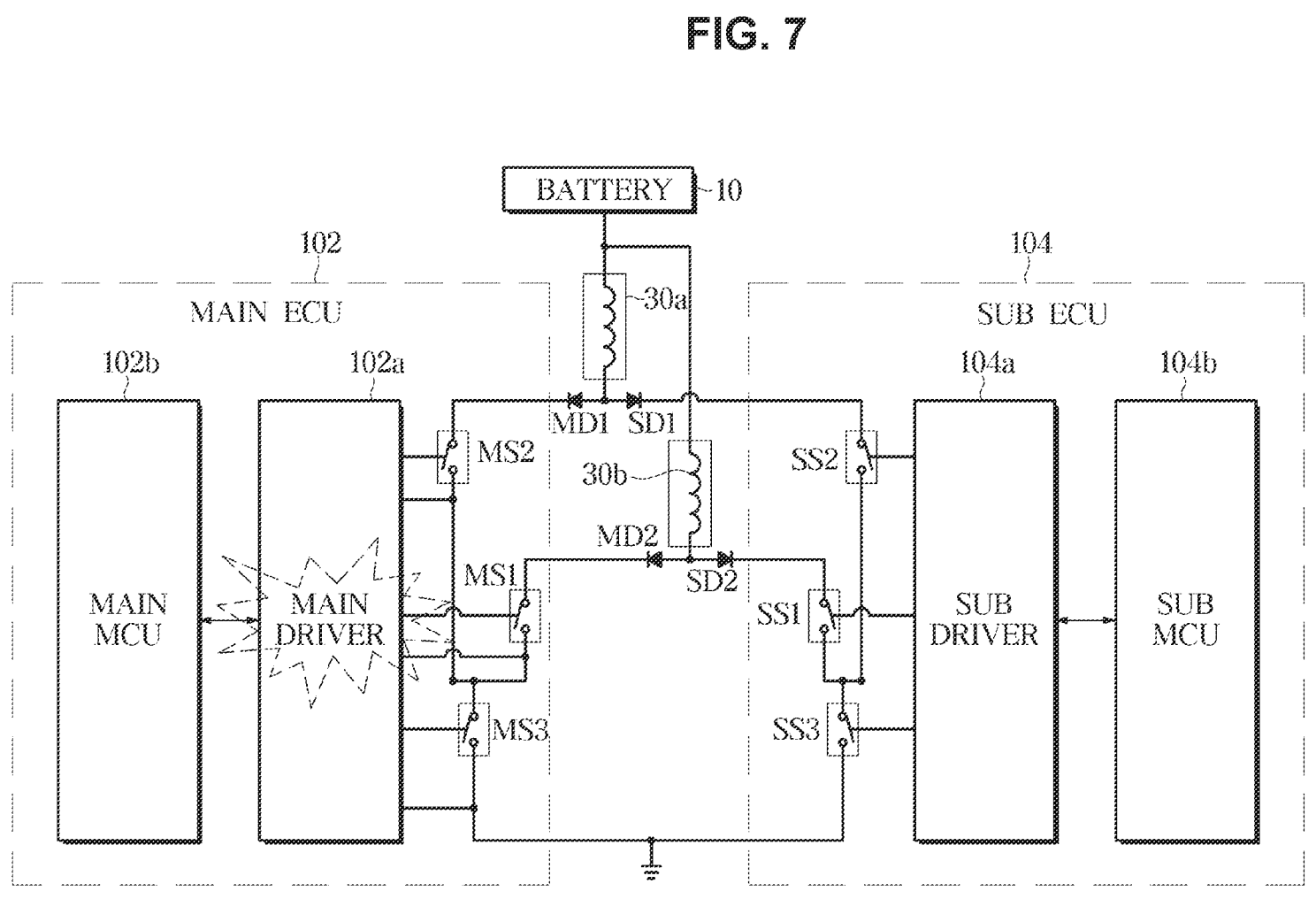

FIG. 3 is a circuit diagram showing as an example of a solenoid valve driving apparatus according to an exemplary embodiment of the present invention and FIG. 4 is a circuit diagram illustrating a state in which the first main voltage regulating switching element shown in FIG. 3 operates abnormally. FIG. 5 is a circuit diagram illustrating a state in which the second main voltage regulating switching element shown in FIG. 3 operates abnormally, and FIG. 6 is a circuit diagram illustrating a state in which the main power supply cutoff switching element shown in FIG. 3 operates abnormally. FIG. 7 is a circuit diagram illustrating a state in which the main driver shown in FIG. 3 is abnormally operated as an example.

Referring to FIGS. 3 to 7, the solenoid valve driving apparatus according to an exemplary embodiment of the present invention may include a plurality of solenoid coils 30a and 30b, a main ECU 102 and a sub ECU 104.

The plurality of solenoid coils 30a and 30b may be connected to the battery 10.

In this case, the plurality of solenoid coils 30a and 30b may include a first solenoid coil 30a and a second solenoid coil 30b, and may be further provided in three or more.

Here, the solenoid coils 30a and 30b may be designated as a plurality of groups, and the plurality of groups may be powered and cut off by the main cut-off switching element MS3 and the sub cut-off switching element SS3.

The main electronic elements of the main ECU 102 may include a plurality of main switching elements MS1, MS2, and MS3, a main driver 102a, and a main MCU 102b.

One end of the plurality of main switching elements MS1, MS2, and MS3 may be connected to the plurality of solenoid coils 30a and 30b and the other end may be connected to the ground.

In this case, the plurality of main switching elements MS1, MS2, and MS3 may include main driving switching elements MS1 and MS2 and main cut-off switching elements MS3.

The main driving switching elements MS1 and MS2 may include a first main driving switching element MS1 and a second main driving switching element MS2, and may be further provided in three or more, and the main cut-off switching elements MS3 may be provided in two or more.

Here, the main cut-off switching element MS3 may be provided separately from the main driver 102a to be described later, or may be provided in an integrated type to the main driver 102a.

The main driver 102a receives battery power from the battery 10 by a switching turn-on operation of the plurality of main switching elements MS1, MS2, MS3, and drives the plurality of solenoid coils 30a, 30b, and the main MCU 102b may control the main driver 102a.

The solenoid valve driving apparatus according to an exemplary embodiment of the present invention may further include a plurality of main diodes MD1 and MD2.

At this time, the plurality of main diodes MD1 and MD2 may include a first main diode MD1 and a second main diode MD2, one end of the plurality of main diodes MD1 and MD2 may be connected to the main driving switching elements MS1 and MS2, and the other end may be connected to the plurality of solenoid coils 30a and 30b.

The plurality of main diodes MD1 and MD2 allow current from the plurality of solenoid coils 30a and 30b to the main driving switching elements MS1 and MS2, respectively, and block currents from the sub driving switching elements SS1 and SS2 to the plurality of solenoid coils 30a and 30b.

This, the plurality of main diodes (MD1, MD2) is to not affect the normal operation of the solenoid coil (30b) due to an abnormal operation of the solenoid coil (30a) among the plurality of solenoid coils (30a, 30b).

The sub electronic elements of the sub ECU 104 may include a plurality of sub switching elements SS1, SS2, and SS3, a sub driver 104a, and a sub MCU 104b.

One end of the plurality of sub switching elements SS1, SS2, and SS3 may be connected to the plurality of solenoid coils 30a and 30b, and the other end may be connected to the battery 10.

In this case, the plurality of sub switching elements SS1, SS2, and SS3 may include sub driving switching elements SS1 and SS2 and a sub cut-off switching element SS3.

The sub driving switching elements SS1 and SS2 may include a first sub driving switching element SS1 and a second sub driving switching element SS2, and the sub driving switching elements SS1 and SS2 may be further provided in three or more, and the sub cut-off switching elements SS3 may be further provided in two or more.

Here, the sub cut-off switching element SS3 may be provided separately from the sub driver 104a to be described below, or may be provided in an integrated type to the sub driver 104a.

The sub driver 104a may drive the plurality of solenoid coils 30a and 30b by receiving battery power from the battery 10 by the switching turn-on operation of the plurality of sub switching elements SS1, SS2, SS3.

The solenoid valve driving apparatus according to an exemplary embodiment of the present invention may further include a plurality of sub diodes SD1 and SD2.

In this case, the plurality of sub diodes SD1 and SD2 may include a first sub diode SD1 and a second sub diode SD2, one end of the plurality of sub diodes SD1 and SD2 is connected to the sub driving switching elements SS1 and SS2, and the other end is connected to the plurality of solenoid coils 30a and 30b and may be connected to face the plurality of main diodes MD1 and MD2.

When at least one of the main driver 102a and the plurality of main switching elements MS1, MS2, MS3 operates abnormally, the sub MCU 104b communicates with the main MCU 102b to turn on the sub driver 104a, thereby controlling the sub driver 104a.

Here, the main MCU 102b determines that at least one output signal of the main driver 102a and the plurality of main switching elements MS1, MS2, MS3 is not the set target signal, the main MCU 102b may determine that at least one of the main driver 102a and the plurality of main switching elements MS1, MS2, and MS3 operate abnormally.

In this case, the output signal may be at least one of an output voltage value and an output current value, and the target signal may be at least one of a target voltage value and a target current value.

As an example, as shown in FIG. 4, the main MCU 102b determines that the first output signal of the first main driving switching element MS1 among the output signals of the main driver 102a and the output signals of the plurality of main switching elements MS1, MS2, MS3 is not the first target signal among the target signals, the main MCU 102b may determine that the first main driving switching element MS1 operates abnormally.

As another example, as shown in FIG. 5, when the main MCU 102b determines that the second output signal of the second main driving switching element MS2 among the output signals of the main driver 102a and the output signals of the plurality of main switching elements MS1, MS2, MS3 is not the second target signal among the target signals, the main MCU 102b may determine that the second main driving switching element MS2 operates abnormally.

As another example, as shown in FIG. 6, when the main MCU 102b determines that the third output signal of the main cut-off switching element MS3 among the output signals of the main driver 102a and the output signals of the plurality of main switching elements MS1, MS2, MS3 is not the third target signal among the target signals, the main MCU 102b may determine that the main cut-off switching element MS3 operates abnormally.

As another example, as shown in FIG. 7, when the main MCU 102b determines that the fourth output signal of the main driver 102a among the output signals of the main driver 102a and the output signals of the plurality of main switching elements MS1, MS2, MS3 is not the fourth target signal among the target signals, the main MCU 102b may determine that the main driver 102a operates abnormally.

Figure 8:
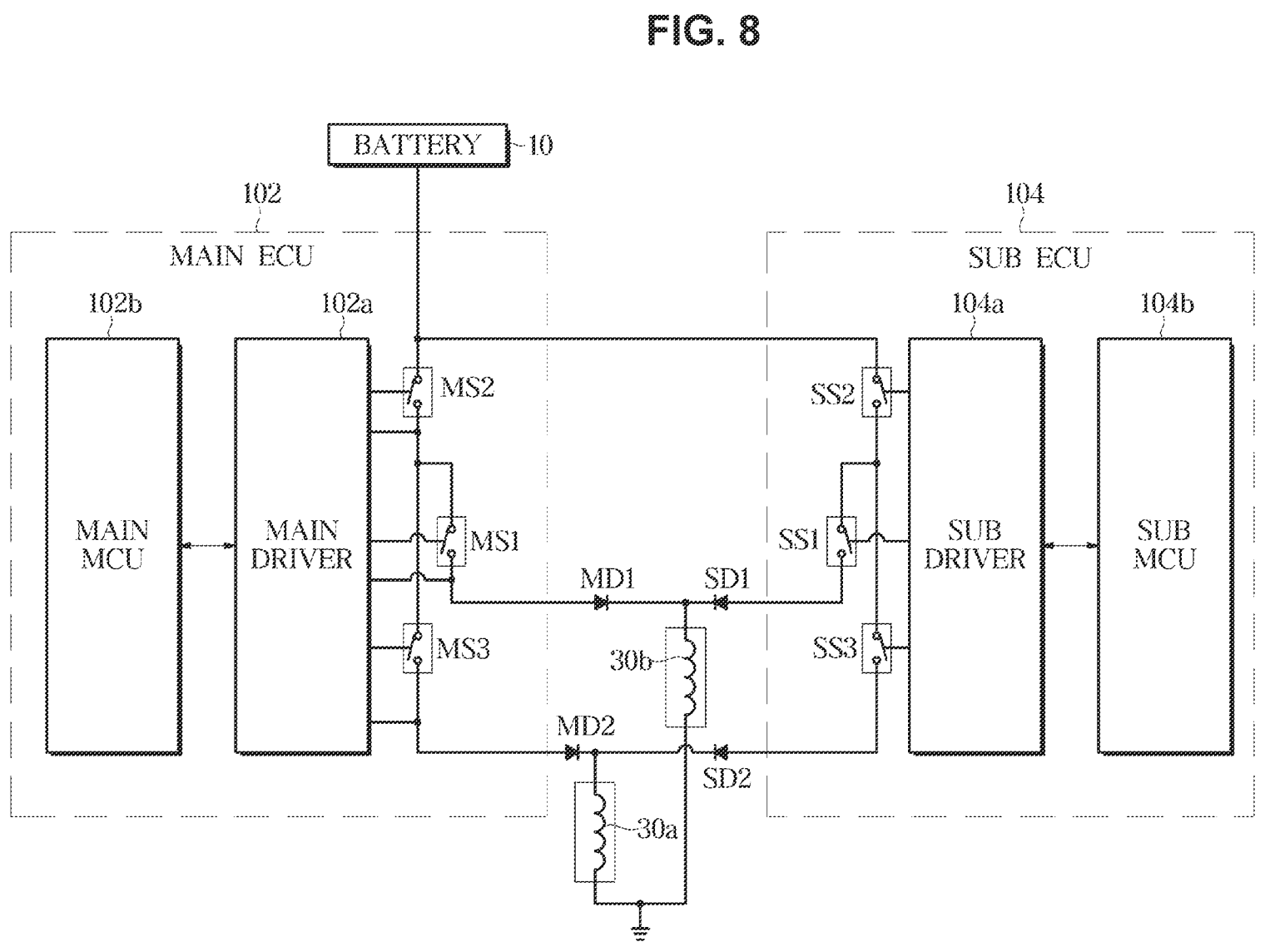
Figure 9:
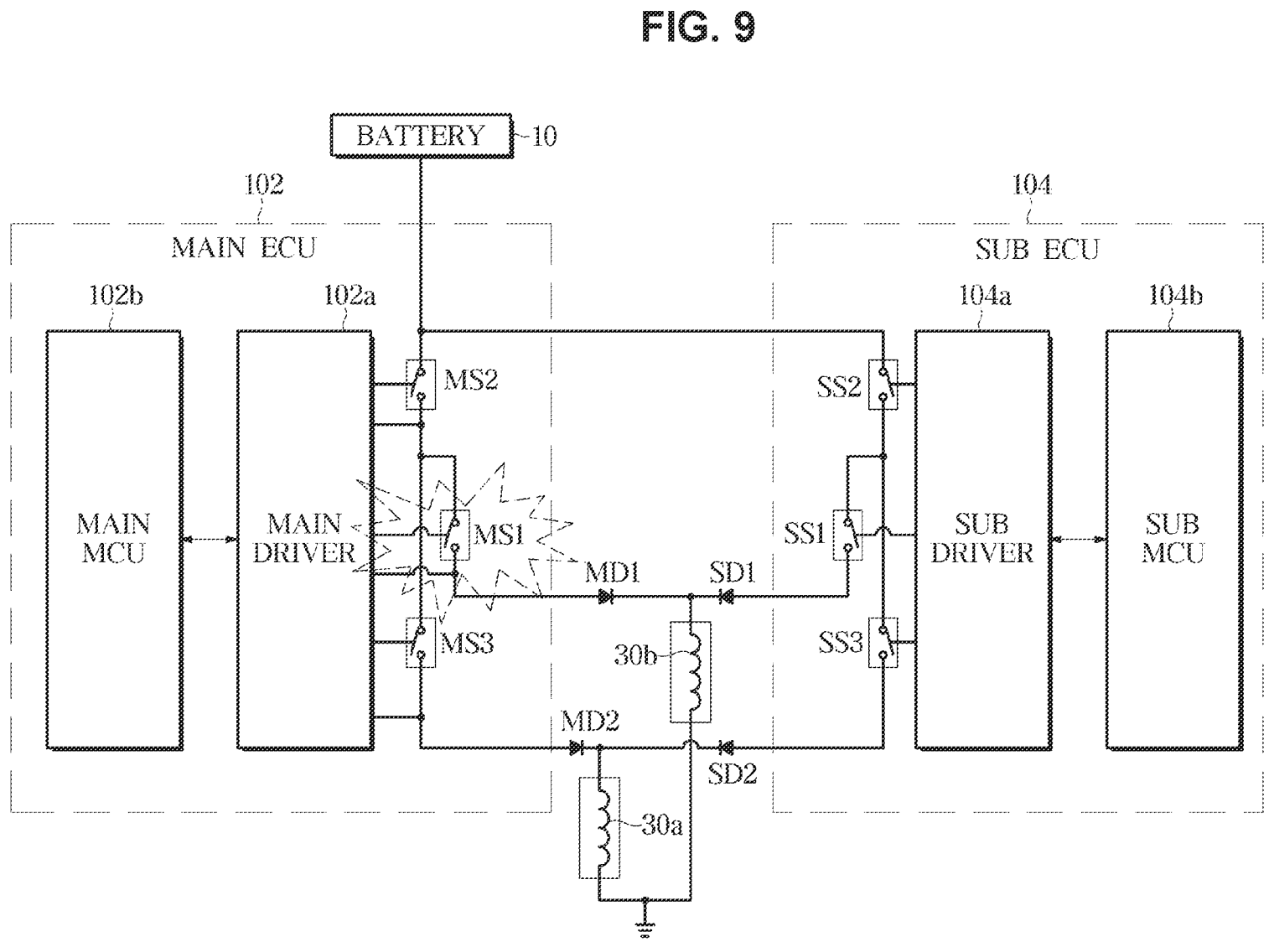
Figure 10:
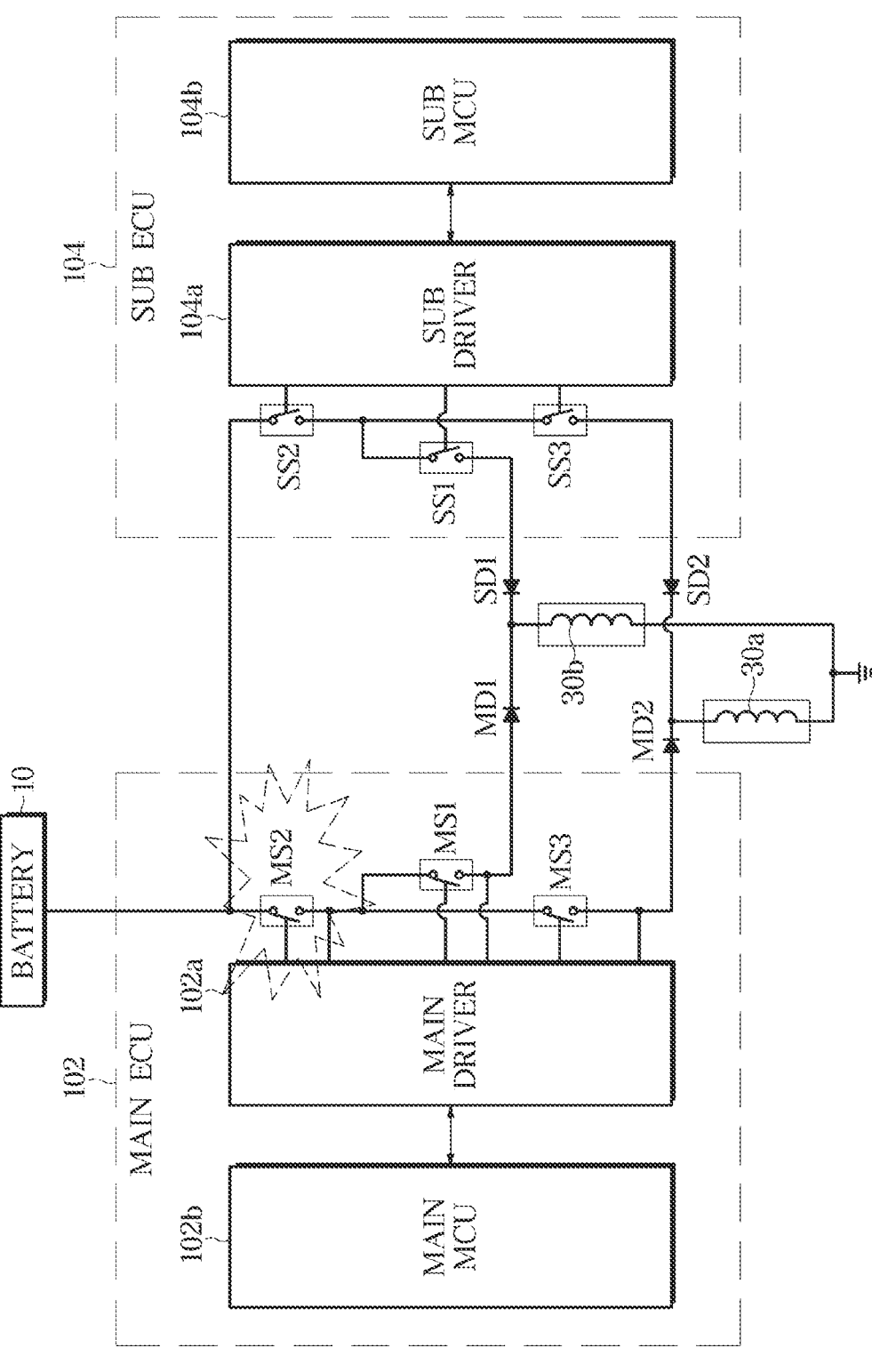
FIG. 10 is a circuit diagram illustrating a state in which the second main voltage regulating switching element shown in FIG. 8 is abnormally operated, as another example.
Figure 11:
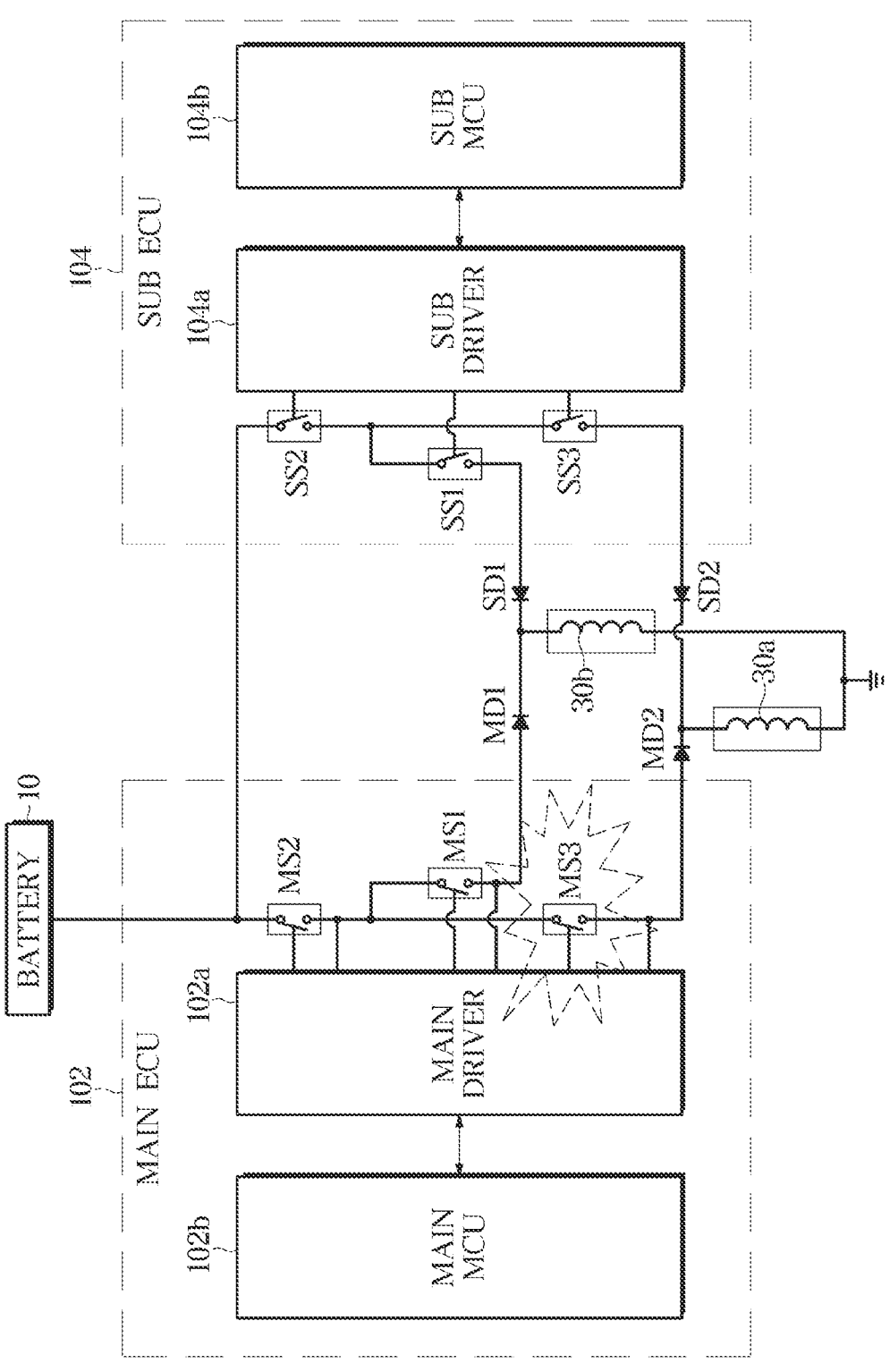
FIG. 11 is a circuit diagram illustrating a state in which the main power supply cutoff switching element shown in FIG. 8 is abnormally operated, as another example.
Figure 12:
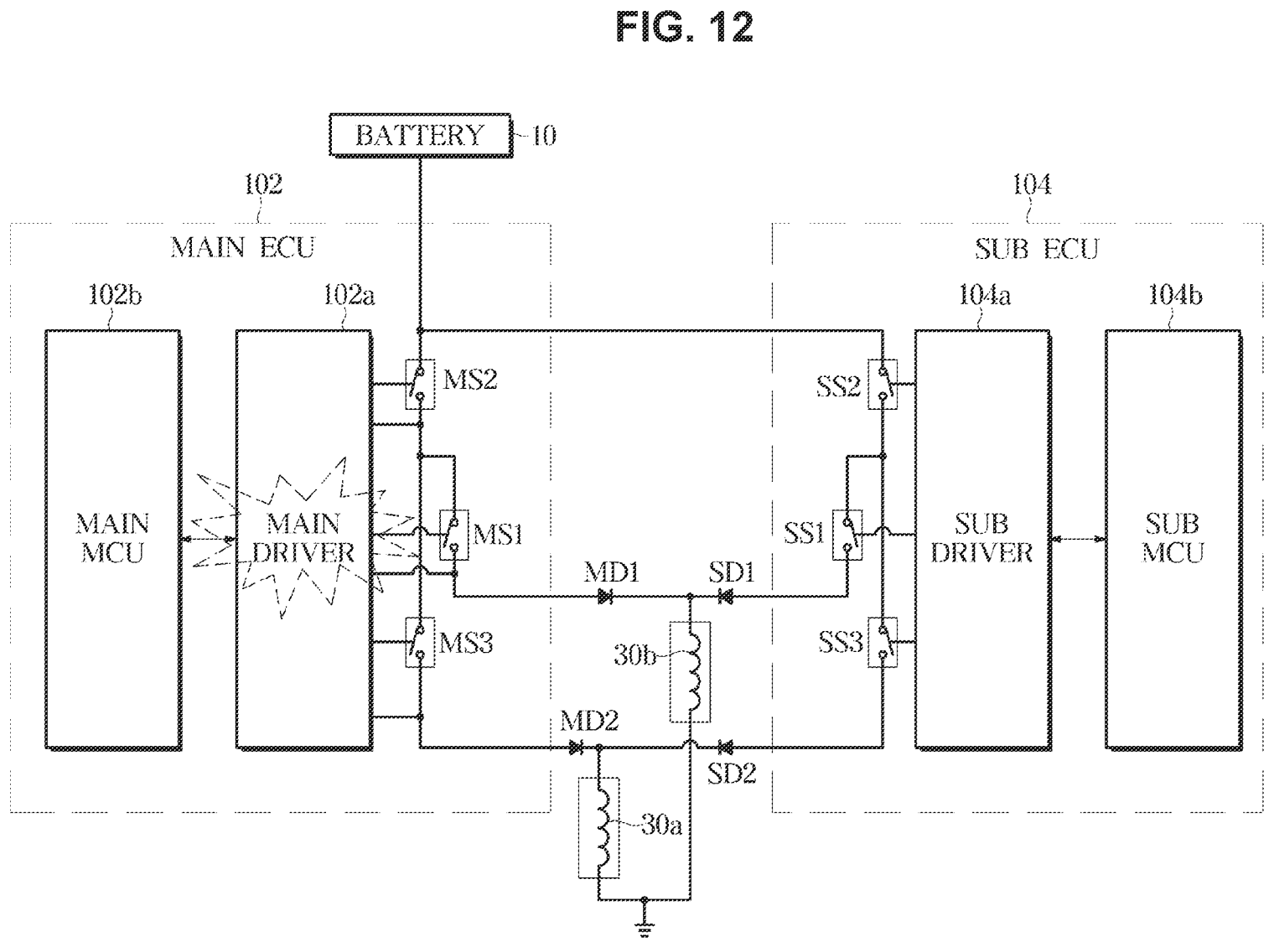

FIG. 8 is a circuit diagram illustrating a solenoid valve driving apparatus according to an exemplary embodiment of the present invention as another example, FIG. 9 is a circuit diagram illustrating a state in which the first main voltage regulating switching element shown in FIG. 8 is abnormally operated, as another example, FIG. 10 is a circuit diagram illustrating a state in which the second main voltage regulating switching element shown in FIG. 8 is abnormally operated, as another example, FIG. 11 is a circuit diagram illustrating a state in which the main power supply cutoff switching element shown in FIG. 8 is abnormally operated, as another example, and FIG. 12 is a circuit diagram illustrating a state in which the main driver shown in FIG. 8 is abnormally operated, as another example.

Referring to FIGS. 8 to 12, the solenoid valve driving apparatus according to an exemplary embodiment of the present invention may include a plurality of solenoid coils 30a and 30b, a main ECU 102 and a sub ECU 104.

The plurality of solenoid coils 30a and 30b may be connected to the ground.

In this case, the plurality of solenoid coils 30a and 30b may include a first solenoid coil 30a and a second solenoid coil 30b, and may be further provided in three or more.

Here, the solenoid coils 30a and 30b may be designated as a plurality of groups, and the plurality of groups may be powered and cut off by the main cutoff switching element MS3 and the sub cutoff switching element SS3.

The main electronic elements of the main ECU 102 may include a plurality of main switching elements MS1, MS2, and MS3, a main driver 102a, and a main MCU 102b.

One end of the plurality of main switching elements MS1, MS2, and MS3 may be connected to the plurality of solenoid coils 30a and 30b and the other end may be connected to the battery 10.

In this case, the plurality of main switching elements MS1, MS2, and MS3 may include main driving switching elements MS1 and MS3 and a main cut-off switching element MS2.

The main driving switching elements MS1 and MS3 may include a first main driving switching element MS1 and a second main driving switching element MS3, and three or more may be further provided, and a main cut-off switching element MS2 may be further provided in two or more.

Here, the main cut-off switching element MS2 may be provided separately from the main driver 102a to be described below, or may be provided in an integrated type to the main driver 102a.

The main driver 102a may drive a plurality of solenoid coils 30a and 30b by receiving battery power from the battery 10 by a switching turn-on operation of the plurality of main switching elements MS1, MS2, and MS3, and the main MCU 102b may control the main driver 102a.

The solenoid valve driving apparatus according to an exemplary embodiment of the present invention may further include a plurality of main diodes MD1 and MD2.

At this time, the plurality of main diodes MD1 and MD2 may include a first main diode MD1 and a second main diode MD2, one end of the plurality of main diodes MD1 and MD2 may be connected to the main driving switching elements MS1 and MS2, and the other end may be connected to the plurality of solenoid coils 30a and 30b.

This, the plurality of main diodes (MD1, MD2) is to not affect the normal operation of the solenoid coil (30b) due to an abnormal operation of the solenoid coil (30a) among the plurality of solenoid coils (30a, 30b).

The sub electronic elements of the sub ECU 104 may include a plurality of sub switching elements SS1, SS2, and SS3, a sub driver 104a, and a sub MCU 104b.

One end of the plurality of sub switching elements SS1, SS2, and SS3 may be connected to the plurality of solenoid coils 30a and 30b, and the other end may be connected to the battery 10.

In this case, the plurality of sub switching elements SS1, SS2, and SS3 may include sub driving switching elements SS1 and SS3 and a sub cut-off switching element SS2.

The sub driving switching elements SS1 and SS3 may include a first sub driving switching element SS1 and a second sub driving switching element SS3, and the sub driving switching elements SS1 and SS3 may be further provided in three or more, and the sub cut-off switching elements SS2 may be further provided in two or more.

Here, the sub cut-off switching element SS2 may be provided separately from the sub driver 104a to be described below, or may be provided in an integrated type to the sub driver 104a.

The sub driver 104a may drive the plurality of solenoid coils 30a and 30b by receiving battery power from the battery 10 by the switching turn-on operation of the plurality of sub switching elements SS1, SS2, SS3.

The solenoid valve driving apparatus according to an exemplary embodiment of the present invention may further include a plurality of sub diodes SD1 and SD2.

In this case, the plurality of sub diodes SD1 and SD2 may include a first sub diode SD1 and a second sub diode SD2, one end of the plurality of sub diodes SD1 and SD2 is connected to the sub driving switching elements SS1 and SS2, and the other end is connected to the plurality of solenoid coils 30a and 30b and may be connected to face the plurality of main diodes MD1 and MD2.

The plurality of sub diodes SD1 and SD2 allow currents from the plurality of solenoid coils 30a and 30b to the sub driving switching elements SS1 and SS2, respectively, and block currents from the sub driving switching elements SS1 and SS2 to the plurality of solenoid coils 30a and 30b.

When at least one of the main driver 102a and the plurality of main switching elements MS1, MS2, MS3 operates abnormally, the sub MCU 104b communicates with the main MCU 102b to turn on the sub driver 104a, thereby controlling the sub driver 104a.

Here, when the main MCU 102b determines that at least one output signal of the main driver 102a and the plurality of main switching elements MS1, MS2, MS3 is not the set target signal, the main MCU 102b may determine that at least one of the main driver 102a and the plurality of main switching elements MS1, MS2, and MS3 operate abnormally.

In this case, the output signal may be at least one of an output voltage value and an output current value, and the target signal may be at least one of a target voltage value and a target current value.

As an example, as shown in FIG. 9, the main MCU 102b determines that the first output signal of the first main driving switching element MS1 among the output signals of the main driver 102a and the output signals of the plurality of main switching elements MS1, MS2, MS3 is not the first target signal among the target signals, the main MCU 102b may determine that the first main driving switching element MS1 operates abnormally.

As another example, as shown in FIG. 10, when the main MCU 102b determines that the second output signal of the second main driving switching element MS2 among the output signals of the main driver 102a and the output signals of the plurality of main switching elements MS1, MS2, MS3 is not the second target signal among the target signals, the main MCU 102b may determine that the second main driving switching element MS2 operates abnormally.

As another example, as shown in FIG. 11, when the main MCU 102b determines that the third output signal of the main cut-off switching element MS3 among the output signals of the main driver 102a and the output signals of the plurality of main switching elements MS1, MS2, MS3 is not the third target signal among the target signals, the main MCU 102b may determine that the main cut-off switching element MS3 operates abnormally.

As another example, as shown in FIG. 12, when the main MCU 102b determines that the fourth output signal of the main driver 102a among the output signals of the main driver 102a and the output signals of the plurality of main switching elements MS1, MS2, MS3 is not the fourth target signal among the target signals, the main MCU 102b may determine that the main driver 102a operates abnormally.

Figure 13:
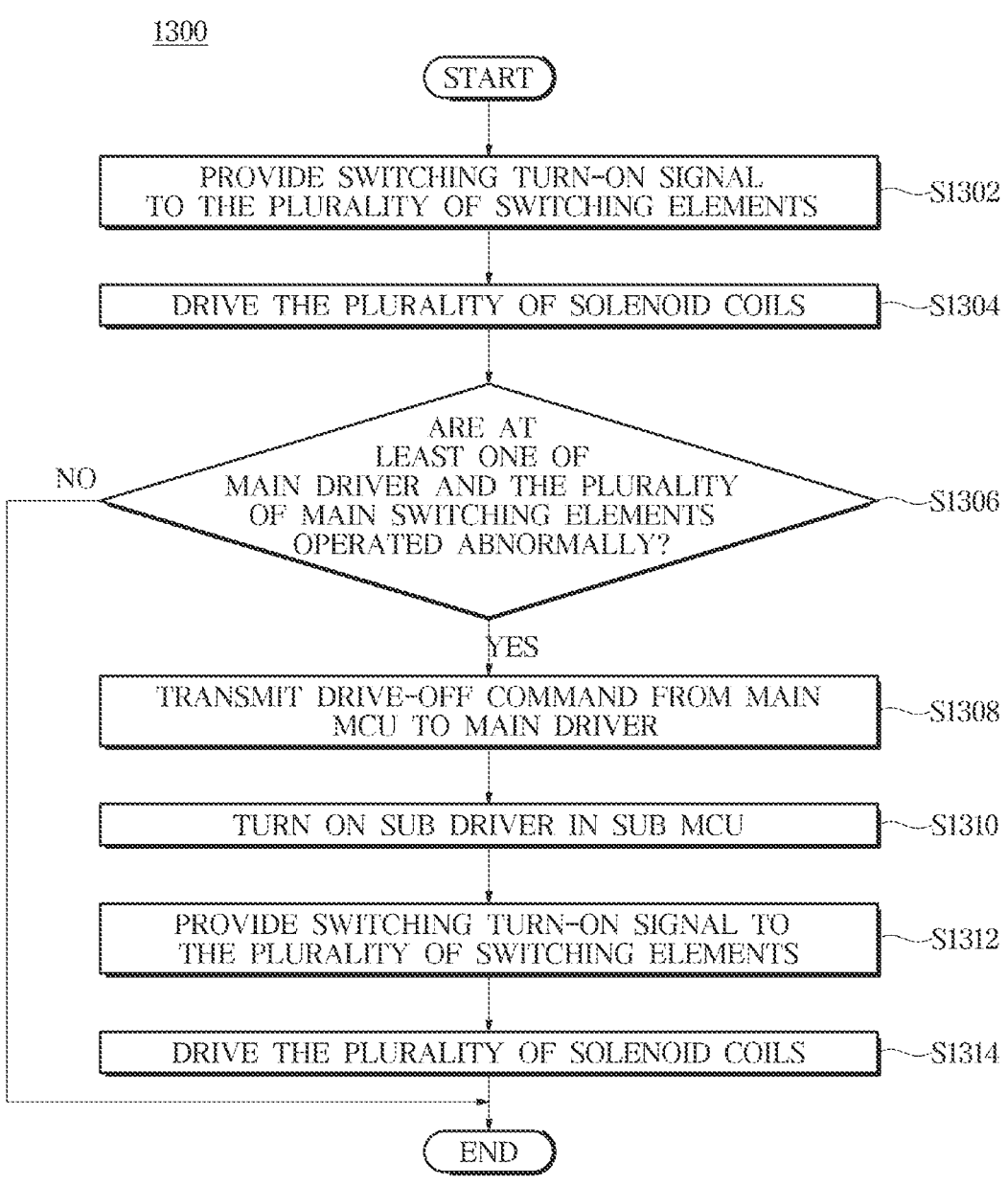
FIG. 13 is a flowchart illustrating a method of driving a solenoid valve of a solenoid valve driving apparatus according to an exemplary embodiment of the present invention as an example.

FIG. 13 is a flowchart illustrating a method of driving a solenoid valve of a solenoid valve driving apparatus according to an exemplary embodiment of the present invention as an example.

As an example, referring to FIG. 13, a method of driving a solenoid valve 1300 of a solenoid valve driving apparatus according to an exemplary embodiment of the present invention includes a first step S1302, a second step S1304, and a third step S1306, S1308, S1310, a fourth step S1312 and a fifth step S1314.

In the first step S1302, a switching turn-on signal is provided from the main driver (102a in FIG. 1) to a plurality of main switching elements (MS1, MS2, MS3 in FIG. 3) including a main driving switching element (MS1, MS2 in FIG. 3) and a main cut-off switching element (MS3 in FIG. 3), connected at one end to a plurality of solenoid coils (30a and 30b in FIG. 3) and the other end to ground.

In the second step S1304, the plurality of solenoid coils (30a, 30b in FIG. 3) connected to the battery (10 in FIG. 3) by receiving battery power from the battery (10 in FIG. 3) by a switching turn-on operation of a plurality of main switching elements (MS1, MS2, MS3 in FIG. 3) are driven by the main driver (102a in FIG. 3).

In the third step S1306, it is determined whether at least one of the main driver (102a in FIG. 3) and the plurality of main switching elements (MS1, MS2, MS3 in FIG. 3) operate abnormally in the main MCU (102*b* in FIG. 3) controlling the main driver (102*a* in FIG. 3).

At this time, the third step S1306 is when determining whether at least one of the main driver (102*a* of FIGS. 4 to 7) and a plurality of main switching elements (MS1, MS2, MS3 of FIGS. 4 to 7) is abnormally operated, it is possible to determine whether the output signal of at least one of the main driver (102A of FIGS. 4 to 7) and the plurality of main switching elements (MS1, MS2, MS3 of FIGS. 4 to 7) in the main MCU (102B of FIGS. 4 to 7) is not a target signal set in the main MCU (102B of FIGS. 4 to 7).

In the third step S1308, when it is determined that at least one of the main driver (102*a* of FIG. 7) and the plurality of main switching elements (MS1, MS2, MS3 of FIGS. 4 to 6) in the main MCU (102*b* of FIGS. 4 to 7) operate abnormally, a drive-off command is transmitted from the main MCU (102*b* of FIGS. 4 to 7) to the main driver (102*a* of FIGS. 4 to 7).

In the third step S1310, the sub driver (104*a* in FIGS. 4 to 7) is turned on in the sub MCU (104*a* of FIGS. 4 to 7) which communicates with the main MCU (102*b* of FIGS. 4 to 7) and controls the sub driver (104*a* of FIGS. 4 to 7).

In the fourth step S1312, a switching turn-on signal is provided from the sub driver (104*a* in FIGS. 4 to 7) to a plurality of sub switching elements (SS1, SS2, SS3 in FIGS. 4 to 7) including a sub driving switching element (SS1, SS2 in FIGS. 4 to 7) and a sub cut-off switching element (SS3 in FIGS. 4 to 7), connected at one end to a plurality of solenoid coils (30*a* and 30*b* in FIGS. 4 to 7) and the other end to ground.

In the fifth step S1314, the plurality of solenoid coils (30*a*, 30*b* in FIGS. 4 to 7) connected to the battery (10 in FIGS. 4 to 7) by receiving battery power from the battery (10 in FIGS. 4 to 7) by a switching turn-on operation of a plurality of sub switching elements (SS1, SS2, SS3 in FIGS. 4 to 7) are driven by the sub driver (104*a* in FIGS. 4 to 7).

As another example, referring to FIG. 13, a method of driving a solenoid valve 1300 of a solenoid valve driving apparatus according to an exemplary embodiment of the present invention includes a first step (S1302), a second step (S1304), and a third step (S1306, S1308, S1310), a fourth step (S1312) and a fifth step (S1314).

In the first step S1302, a switching turn-on signal is provided from the main driver (102*a* in FIG. 8) to a plurality of main switching elements (MS1, MS2, MS3 in FIG. 8) including a main driving switching element (MS1, MS3 in FIG. 8) and a main cut-off switching element (MS2 in FIG. 8), connected at one end to a plurality of solenoid coils (30*a* and 30*b* in FIG. 8) and the other end to ground.

In the second step S1304, the plurality of solenoid coils (30*a*, 30*b* in FIG. 8) connected to the battery (10 in FIG. 8) by receiving battery power from the battery (10 in FIG. 8) by a switching turn-on operation of a plurality of main switching elements (MS1, MS2, MS3 in FIG. 8) are driven by the main driver (102*a* in FIG. 8).

In the third step S1306, it is determined whether at least one of the main driver (102*a* in FIG. 6) and the plurality of main switching elements (MS1, MS2, MS3 in FIG. 6) operate abnormally in the main MCU (102*b* in FIG. 6) controlling the main driver (102*a* in FIG. 6).

At this time, the third step S1306 is when determining whether at least one of the main driver (102*a* of FIGS. 9 to 12) and a plurality of main switching elements (MS1, MS2, MS3 of FIGS. 9 to 12) is abnormally operated, it is possible to determine whether the output signal of at least one of the main driver (102A of FIGS. 9 to 12) and the plurality of main switching elements (MS1, MS2, MS3 of FIGS. 9 to 12) in the main MCU (102B of FIGS. 9 to 12) is not a target signal set in the main MCU (102B of FIGS. 9 to 12).

In the third step S1308, when it is determined that at least one of the main driver (102*a* of FIG. 12) and the plurality of main switching elements (MS1, MS2, MS3 of FIGS. 9 to 11) in the main MCU (102*b* of FIGS. 9 to 12) operate abnormally, a drive-off command is transmitted from the main MCU (102*b* of FIGS. 9 to 11) to the main driver (102*a* of FIGS. 9 to 11).

In the third step S1310, the sub driver (104*a* in FIGS. 9 to 12) is turned on in the sub MCU (104*a* of FIGS. 9 to 12) which communicates with the main MCU (102*b* of FIGS. 9 to 12) and controls the sub driver (104*a* of FIGS. 9 to 12).

In the fourth step S1312, a switching turn-on signal is provided from the sub driver (104*a* in FIGS. 9 to 12) to a plurality of sub switching elements (SS1, SS2, SS3 in FIGS. 9 to 12) including a sub driving switching element (SS1, SS2 in FIGS. 9 to 12) and a main cut-off switching element (SS3 in FIGS. 9 to 12), connected at one end to a plurality of solenoid coils (30*a* and 30*b* in FIGS. 9 to 12) and the other end to ground.

In the fifth step S1314, the plurality of solenoid coils (30*a*, 30*b* in FIGS. 9 to 12) connected to the battery (10 in FIGS. 9 to 12) by receiving battery power from the battery (10 in FIGS. 9 to 12) by a switching turn-on operation of a plurality of sub switching elements (SS1, SS2, SS3 in FIGS. 9 to 12) are driven by the sub driver (104*a* in FIGS. 9 to 12).

Figure 14:
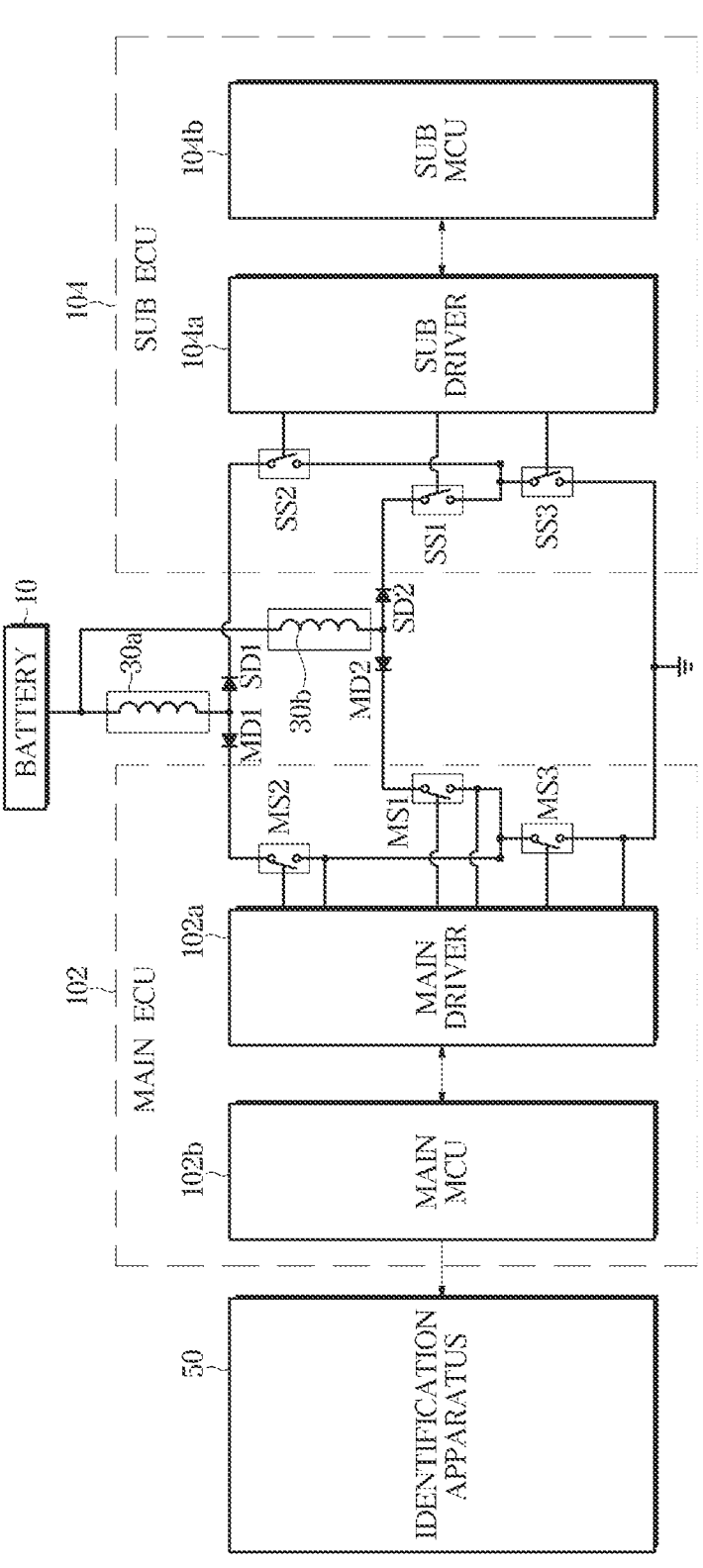
FIG. 14 is a circuit diagram illustrating a state in which a solenoid valve driving apparatus according to an exemplary embodiment of the present invention is connected to an identification apparatus.
Figure 15:
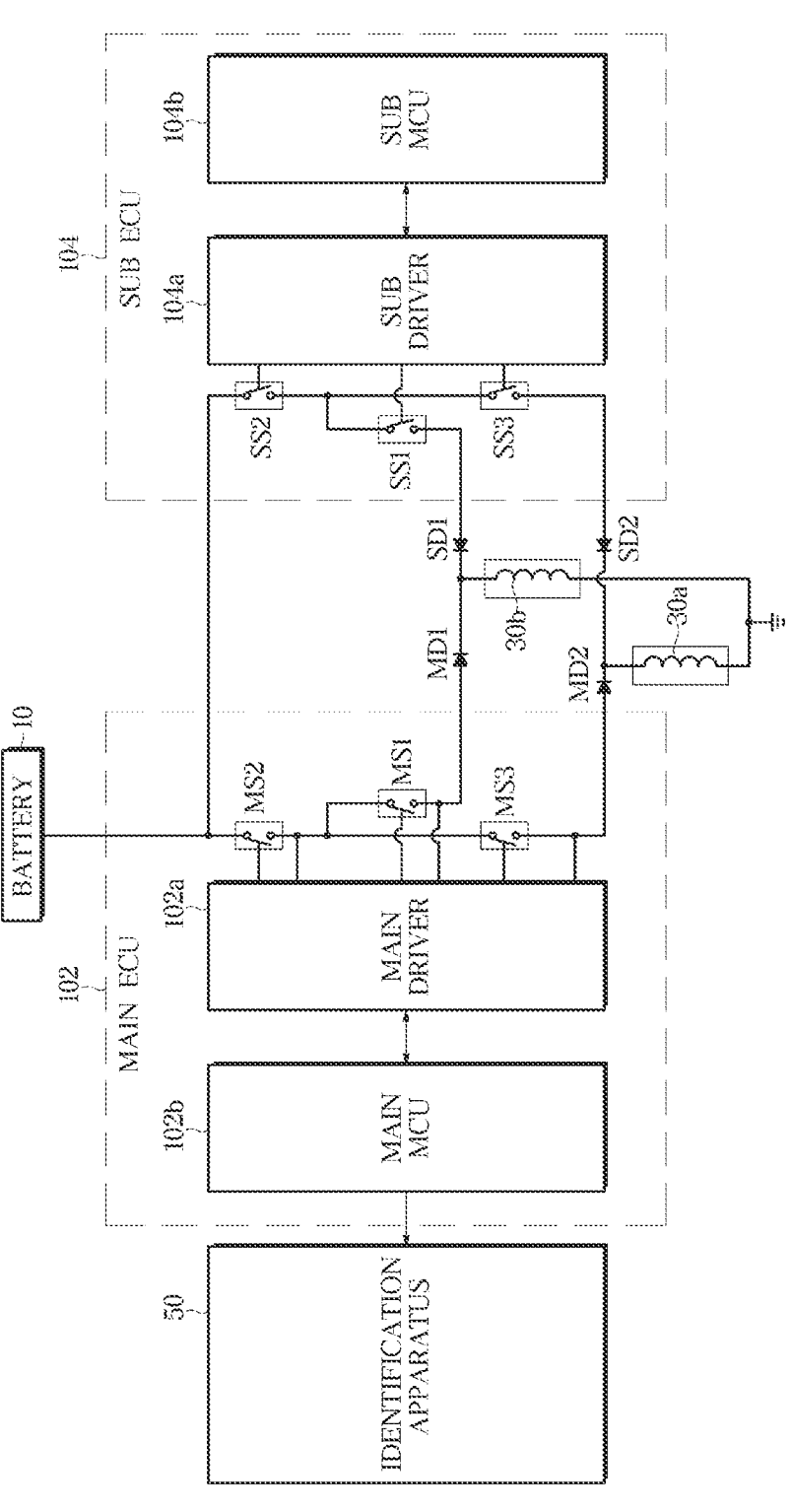
FIG. 15 is a circuit diagram illustrating a state in which a solenoid valve driving apparatus according to an exemplary embodiment of the present invention is connected to an identification apparatus as another example.

FIG. 14 is a circuit diagram illustrating a state in which a solenoid valve driving apparatus according to an exemplary embodiment of the present invention is connected to an identification apparatus, and FIG. 15 is a circuit diagram illustrating a state in which a solenoid valve driving apparatus according to an exemplary embodiment of the present invention is connected to an identification apparatus as another example.

Referring to FIGS. 14 and 15, when it is determined that at least one output signal of the main driver 102*a* and the plurality of main switching elements MS1, MS2, MS3 is not the set target signal, the main MCU 102*b* of the solenoid valve driving apparatus according to an exemplary embodiment of the present invention may further transmit an identification command to the identification apparatus 50 from the main MCU 102*b* In order to identify that the identification apparatus 50 operates abnormally in at least one of the current main driver 102*a* and the current plurality of main switching elements MS1, MS2, MS3.

At this time, although not shown, the identification apparatus 50 may include at least one of an alarm (not shown) and a speaker (not shown), and may identify that the current main driver and at least one of the plurality of main switching elements currently operate abnormally through at least one of an alarm operation of an alarm (not shown) and a voice operation of a speaker (not shown).

In addition, although not shown, the identification apparatus 50 may include at least one of an instrument panel (not shown) mounted to allow the driver to grasp information or status of the vehicle by interfacing the user with the machine, a human machine interface (HMI) module (not shown) and a head-up display (HUD) module (not shown), and may identify that the current main driver 102*a* and at least one of the plurality of main switching elements MS1, MS2, and MS3 currently operate abnormally through at least one of a cluster message display operation of an instrument panel (not shown), an HMI message display operation of an HMI module (not shown), and a HUD message display operation of a HUD module (not shown).

FIG. 16 is a flow chart illustrating a method of driving a solenoid valve of a solenoid valve driving apparatus according to an exemplary embodiment of the present invention as another example.

Referring to FIG. 16, in the third step S1607 of the solenoid valve driving method 1600 of the solenoid valve driving apparatus according to an exemplary embodiment of the present invention, when it is determined that the output signal of at least one of the main driver (102*a* of FIGS. 14 and 15) and the plurality of main switching elements (MS1, MS2, MS3 of FIGS. 14 and 15) in the main MCU (102*b* of FIGS. 14 and 15) is not the set target signal, the main MCU (102*b* of FIGS. 14 and 15) may further transmit an identification command to the identification apparatus (50 of FIGS. 14 and 15) from the main MCU (102*b* of FIGS. 14 and 15) In order to identify that the identification apparatus (50 of FIGS. 14 and 15) operates abnormally in at least one of the current main driver 102*a* and the current plurality of main switching elements (MS1, MS2, MS3 of FIGS. 14 and 15).

Meanwhile, although not shown, the main driver 102*a* and the sub driver 104*a* of the solenoid valve driving apparatus according to an embodiment of the present invention may include a Pulse Width Modulation (PWM) generator (not shown) for providing a switching turn-on signal to the plurality of main switching elements MS1, MS2, MS3 and the plurality of sub switching elements (SS1, SS2, SS3).

The main driver 102*a* and the main MCU 102*b* of the solenoid valve driving apparatus according to an embodiment of the present invention, although not shown, may include at least one of a voltage sensor (not shown), a current sensor (not shown), and a shunt resistor (not shown), and may determine whether the main driver 102*a* and at least one of the plurality of main switching elements MS1, MS2, and MS3 operate abnormally using output signals of the plurality of main switching elements MS1, MS2, MS3 and output signals of the main driver 102*a* of the sensed by at least one of the voltage sensor (not shown), the current sensor (not shown), and the shunt resistor (not shown).

The main driver 102*a* and the sub driver 104*a* of the solenoid valve driving apparatus according to an embodiment of the present invention may be a driving IC, and the driving IC may be an application specific integrated circuit (ASIC).

A plurality of main switching elements (MS1, MS2, MS3) and a plurality of sub switching elements (SS1, SS2, SS3) of the solenoid valve driving apparatus according to an embodiment of the present invention may include at least one of conventional Metal-Oxide Semiconductor Field Effect Transistor (MOSFET), Bipolar Junction Transistor (BTJ), Insulated gate bipolar transistor (IGBT), Gate Turn-Off (GTO) thyristor, MOS Controlled Thyristor(MCT), Silicon Controlled Rectifier Thyristor (SCR Thyristor), a mechanical relay switch and an electronic relay switch, in consideration of the switching loss rate and power consumption.

The main MCU 102*b* of the solenoid valve driving apparatus according to an embodiment of the present invention may perform serial communication with the main driver 102*a*, and the sub MCU 104*b* may perform serial communication with the sub driver 104*a*.

The main MCU 102*b* of the solenoid valve driving apparatus according to an embodiment of the present invention, although not shown, may perform wired communication with the sub MCU 104*b*, and include includes at least one of a Bluetooth module (not shown), a Wi-Fi module (not shown), a Zigbee module (not shown), a Z-Wave module (not shown), a Wibro module (not shown), a Wi-Max module (not shown), LTE module (not shown), LTE Advanced module (not shown), Li-Fi module (not shown), and Beacon module (not shown) to perform wireless communication with the sub MCU 104*b* while taking into account the distortion rate and transmission rate of the communication signal.

The solenoid valve driving apparatus according to an embodiment of the present invention may be applied to a brake apparatus (not shown) that performs an anti-lock brake system (ABS) mode (not shown), as an example, may be applied to an IDB (Integrated Dynamic Brake, not shown) that generates a boosting force and a braking force with one motor as another example, and may be applied to a brake apparatus for autonomous driving (not shown) as another example.

As such, since the solenoid valve driving apparatus according to an embodiment of the present invention can operate the solenoid valve 101*a* by forming a magnetic field by the operation of the solenoid coils 30*a* and 30*b* in the sub ECU 104 instead of the main ECU 102, it is possible to efficiently drive the solenoid valves 30*a* and 30*b*.

In the solenoid valve driving apparatus and the solenoid valve driving method 1300 according to an embodiment of the present invention, since the sub driver 104*a* may be turned on when at least one of the main driver 102*a* and the plurality of main switching elements MS1, MS2, MS3 operates abnormally, it is possible to efficiently drive the solenoid coils 30*a* and 30*b*.

In addition, the solenoid valve driving apparatus and the solenoid valve driving method 1300 according to an embodiment of the present invention may identify that the current main driver 102*a* and at least one of the plurality of main switching elements MS1, MS2, and MS3 currently operate abnormally.

Accordingly, since the solenoid valve driving apparatus and the solenoid valve driving method 1300 according to an embodiment of the present invention may recognize that the current main driver 102*a* and at least one of the plurality of main switching elements MS1, MS2, and MS3 currently operate abnormally, it is possible to shorten the maintenance time for maintenance of the main driver 102*a* and the plurality of main switching elements MS1, MS2, MS3.

What is claimed is:

1. A brake apparatus comprising:
a solenoid valve provided on a flow path and including a coil to open or close the flow path;
a power source electrically and directly connected to the coil to supply a current to the coil;
a main driving switch electrically connected to the coil to allow or block a current flowing through the coil; and
a sub driving switch electrically connected to the coil and connected in parallel with the main driving switch to allow or block the current flowing through the coil;
a main cut-off switch electrically connected in series to the main driving switch and connected to a ground;
a sub cut-off switch electrically connected in series to the sub driving switch and connected to the ground;
a main driver configured to control opening/closing of the main driving switch,
a sub driver configured to control opening/closing of the sub driving switch,
a main processor configured to control the main driver to control the main driving switch for driving the solenoid valve; and a sub processor configured to control the sub driver to control the sub driving switch for driving the solenoid valve, wherein, based on a normal operation of the main driving switch, the main processor is configured to control the main driver to turn on the main cut-off switch and control the main driving switch for driving the solenoid valve with the current supplied from the power source, and the sub processor is configured to control the sub driver to turn off the sub cut-off switch, and wherein, in response to a failure of the main driving switch, the main processor is configured to control the main driver to turn off the main-cut-off switch, and the sub processor is configured to communicate with the main processor and to control the sub driver to turn on the sub cut-off switch and control the sub driving switch for driving the solenoid valve.

2. The brake apparatus of claim 1, further comprising:

a main diode provided between the coil and the main driving switch; and a sub diode provided between the coil and the sub driving switch.

3. The brake apparatus of claim 2, wherein the main driving switch is provided between the coil and the main cut-off switch, and the sub driving switch is provided between the coil and the sub cut-off switch.

4. The brake apparatus of claim 3, wherein the main diode allows a current from the coil to the main driving switch and blocks a current from the main driving switch to the coil, and the sub diode allows a current from the coil to the sub driving switch and blocks a current from the sub driving switch to the coil.

5. A brake apparatus, comprising:

a first solenoid valve including a first coil;

a second solenoid valve including a second coil;

a power source electrically and directly connected to the first and second coils to supply a current to the first and second coils;

a first main driving switch allowing or blocking a current flowing through the first coil;

a second main driving switch allowing or blocking a current flowing through the second coil;

a first sub driving switch connected in parallel with the first main switch to allow or block the current flowing through the first coil;

a second sub driving switch connected in parallel with the second main switch to allow or block the current flowing through the second coil;

a main cut-off switch electrically connected in series to the first and second main driving switches and connected to a ground;

a sub cut-off switch electrically connected in series to the first and second sub driving switches and connected to the ground;

a main driver configured to control the opening and closing of the first main driving switch, the second main driving switch and the main cut-off switch, a sub driver configured to control the opening and closing of the first sub driving switch, the second sub driving switch and the sub cut-off switch, a main processor configured to control the main driver to control the first and second main driving switches for driving the first and second solenoid valves; and a sub processor configured to control the sub driver to control the first and second sub driving switches for driving the first and second solenoid valves, wherein, based on a normal operation of the first main driving switch and the second main driving switch, the main processor is configured to control the main driver to turn on the main cut-off switch and control the first and second main driving switches for driving the first and second solenoid valves with the current supplied from the power source, and the sub processor is configured to control the sub driver to turn off the sub cut-off switch, and wherein, in response to a failure of at least one of the first main driving switch and the second main driving switch, the main processor is configured to control the main driver to turn off the main-cut-off switch, and the sub processor is configured to communicate with the main processor and to control the sub driver to turn on the sub cut-off switch and control the first and second sub driving switches for driving the first and second solenoid valves.

6. The brake apparatus of claim 5, further comprising:

a first main diode provided between the first coil and the first main driving switch;

a second main diode provided between the second coil and the second main driving switch;

a first sub diode provided between the first coil and the first sub driving switch; and a second sub diode provided between the second coil and the second sub driving switch.

7. The brake apparatus of claim 6, wherein the first and second main driving switches are provided between the first and second coils and the main cut-off switch, respectively, and the first and second sub driving switches are provided between the first and second coils and the sub cut-off switch.

8. The brake apparatus of claim 7, wherein the first and second main diodes allow currents from the first and second coils to the first and second main driving switches, respectively, and block current from the first and second main driving switches to the first and second coil, and the first and second sub diodes allows currents from the first and second coils to the first and second sub driving switches, respectively, and blocks current from the first and second sub driving switches to the first and second coils.

* * * * *